US012621289B2

(12) United States Patent
Peddada

(10) Patent No.: US 12,621,289 B2
(45) Date of Patent: *May 5, 2026

(54) HARDWARE-BACKED PASSWORD SECURITY FOR CLOUD SYSTEMS

(71) Applicant: Salesforce, Inc., San Francisco, CA (US)

(72) Inventor: Prasad Peddada, Alameda, CA (US)

(73) Assignee: Salesforce, Inc., San Francisco, CA (US)

( * ) Notice: Subject to any disclaimer, the term of this patent is extended or adjusted under 35 U.S.C. 154(b) by 74 days.

This patent is subject to a terminal disclaimer.

(21) Appl. No.: 18/426,119

(22) Filed: Jan. 29, 2024

(65) Prior Publication Data

US 2024/0422000 A1      Dec. 19, 2024

Related U.S. Application Data

(60) Provisional application No. 63/523,911, filed on Jun. 28, 2023, provisional application No. 63/521,562, filed on Jun. 16, 2023.

(51) Int. Cl.
*H04L 9/40*      (2022.01)
*H04L 9/08*      (2006.01)
*H04L 9/32*      (2006.01)
(52) U.S. Cl.
CPC .......... H04L 63/083 (2013.01); H04L 9/0825 (2013.01); H04L 9/3226 (2013.01); H04L 63/0442 (2013.01)
(58) Field of Classification Search
CPC . H04L 63/083; H04L 63/0442; H04L 9/0825; H04L 9/3226

USPC .......................................................... 713/155
See application file for complete search history.

(56) References Cited

U.S. PATENT DOCUMENTS

| | | | | |
|---|---|---|---|---|
| 7,685,430 | B1 * | 3/2010 | Masurkar ............ | H04L 63/1466 |
| | | | | 380/255 |
| 8,850,219 | B2 * | 9/2014 | Dapkus ................. | H04L 9/3234 |
| | | | | 713/185 |
| 9,491,164 | B1 * | 11/2016 | Fay ........................ | H04L 63/083 |
| 9,608,809 | B1 * | 3/2017 | Ghetti ................... | G06F 21/602 |
| 9,614,670 | B1 * | 4/2017 | Ghetti ................... | H04L 63/065 |
| 10,230,529 | B2 | 3/2019 | Costa et al. | |
| 10,356,088 | B1 * | 7/2019 | Peddada ............... | H04L 9/3213 |
| 10,567,167 | B1 * | 2/2020 | Ghetti ..................... | G06F 21/62 |

(Continued)

*Primary Examiner* — Samson B Lemma
(74) *Attorney, Agent, or Firm* — Holland & Hart, LLP

(57)      ABSTRACT

Methods, systems, and devices for data processing are described. A server host may receive a login request that includes a clear text password for an account associated with a tenant of a multi-tenant cloud platform. The server host may retrieve an encrypted payload associated with the account. The encrypted payload may include a hash value of a user-configured password for the account and an indication of a hashing algorithm used to transform the user-configured password into the hash value. The server host may obtain a wrapped symmetric key provisioned by a symmetric key distribution service. The server host may transmit a request that includes the encrypted payload, the clear text password, and the wrapped symmetric key. The server host may receive a response that indicates whether a hash value of the clear text password from the login request corresponds to the hash value of the user-configured password.

18 Claims, 11 Drawing Sheets

(56) References Cited

U.S. PATENT DOCUMENTS

| 10,637,658 | B2 * | 4/2020 | Peddada | ............... | H04L 9/3234 |
| 11,522,686 | B2 | 12/2022 | Peddada et al. | | |
| 2011/0283110 | A1 * | 11/2011 | Dapkus | ................. | H04L 9/3234 |
| | | | | | 713/182 |
| 2015/0318986 | A1 | 11/2015 | Novak et al. | | |
| 2017/0346797 | A1 * | 11/2017 | Yedidi | .................... | H04L 63/14 |
| 2018/0212762 | A1 * | 7/2018 | Peddada | .............. | H04L 9/3271 |
| 2018/0212785 | A1 * | 7/2018 | Peddada | ............ | H04W 12/069 |
| 2018/0262485 | A1 * | 9/2018 | Roth | ................... | H04L 63/0807 |
| 2019/0052456 | A1 | 2/2019 | Bygrave et al. | | |
| 2019/0229908 | A1 | 7/2019 | Peddada et al. | | |
| 2019/0280860 | A1 * | 9/2019 | Peddada | ................... | H04L 9/14 |
| 2020/0127826 | A1 * | 4/2020 | Ebrahimi | ................ | G06F 21/32 |
| 2020/0137105 | A1 * | 4/2020 | Endler | ............... | G06F 21/6218 |
| 2020/0137109 | A1 * | 4/2020 | Endler | ............... | H04L 63/1433 |
| 2020/0162451 | A1 * | 5/2020 | Alhawaj | ................. | G06F 21/45 |
| 2020/0244636 | A1 * | 7/2020 | Varanasi | ................. | H04L 63/08 |
| 2022/0029802 | A1 * | 1/2022 | Ebrahimi | ................ | G06F 21/64 |
| 2022/0247554 | A1 | 8/2022 | Peddada et al. | | |
| 2023/0342277 | A1 | 10/2023 | Rosati et al. | | |
| 2024/0073032 | A1 | 2/2024 | Sterbling et al. | | |
| 2024/0323034 | A1 | 9/2024 | Kumar | | |
| 2024/0422150 | A1 | 12/2024 | Peddada | | |

* cited by examiner

215 Database

210

205 Symmetric Key Distribution Service

[Symmetric]_Intermediate    305

[Symmetric]_Host Public    320

API Call    310

[Symmetric]_Host Public    315

Provisioning

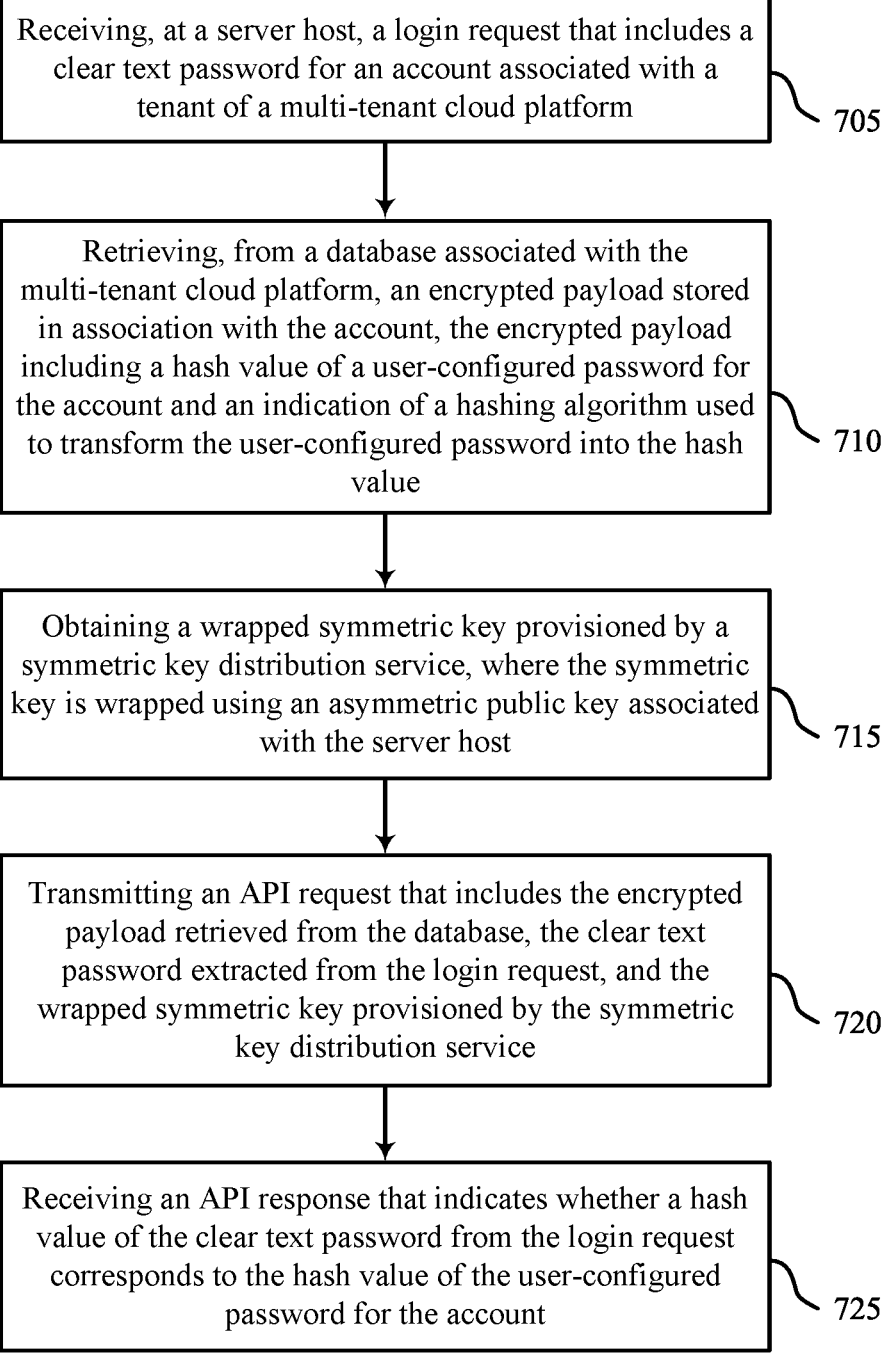

Receiving, at a server host, a login request that includes a clear text password for an account associated with a tenant of a multi-tenant cloud platform
705

Retrieving, from a database associated with the multi-tenant cloud platform, an encrypted payload stored in association with the account, the encrypted payload including a hash value of a user-configured password for the account and an indication of a hashing algorithm used to transform the user-configured password into the hash value
710

Obtaining a wrapped symmetric key provisioned by a symmetric key distribution service, where the symmetric key is wrapped using an asymmetric public key associated with the server host
715

Transmitting an API request that includes the encrypted payload retrieved from the database, the clear text password extracted from the login request, and the wrapped symmetric key provisioned by the symmetric key distribution service
720

Receiving an API response that indicates whether a hash value of the clear text password from the login request corresponds to the hash value of the user-configured password for the account
725

HARDWARE-BACKED PASSWORD SECURITY FOR CLOUD SYSTEMS

CROSS REFERENCE

The present Application for Patent claims priority to and the benefit of U.S. Provisional Application No. 63/521,562 by Peddada et al., entitled "HARDWARE-BACKED PASSWORD SECURITY FOR CLOUD SYSTEMS," filed Jun. 16, 2023 and U.S. Provisional Application No. 63/523,911 by Peddada et al., entitled "HARDWARE-BACKED PASSWORD SECURITY FOR CLOUD SYSTEMS," filed Jun. 28, 2023 each of which are assigned to the assignee hereof, and are expressly incorporated by reference in their entirety herein.

FIELD OF TECHNOLOGY

The present disclosure relates generally to database systems and data processing, and more specifically to hardware-backed password security for cloud systems.

BACKGROUND

A cloud platform (i.e., a computing platform for cloud computing) may be employed by multiple users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

A cloud platform may use hashing techniques to securely store and manage account information (such as passwords). However, as password cracking schemes improve and security standards evolve, keeping all sensitive information protected and up-to-date may be time-consuming and computationally expensive.

BRIEF DESCRIPTION OF THE DRAWINGS

FIGS. 2A, 2B, and 2C show examples of computing systems that support hardware-backed password security for cloud systems in accordance with aspects of the present disclosure.

FIG. 7 shows a flowchart illustrating methods that support hardware-backed password security for cloud systems in accordance with aspects of the present disclosure.

DETAILED DESCRIPTION

Figure 1:
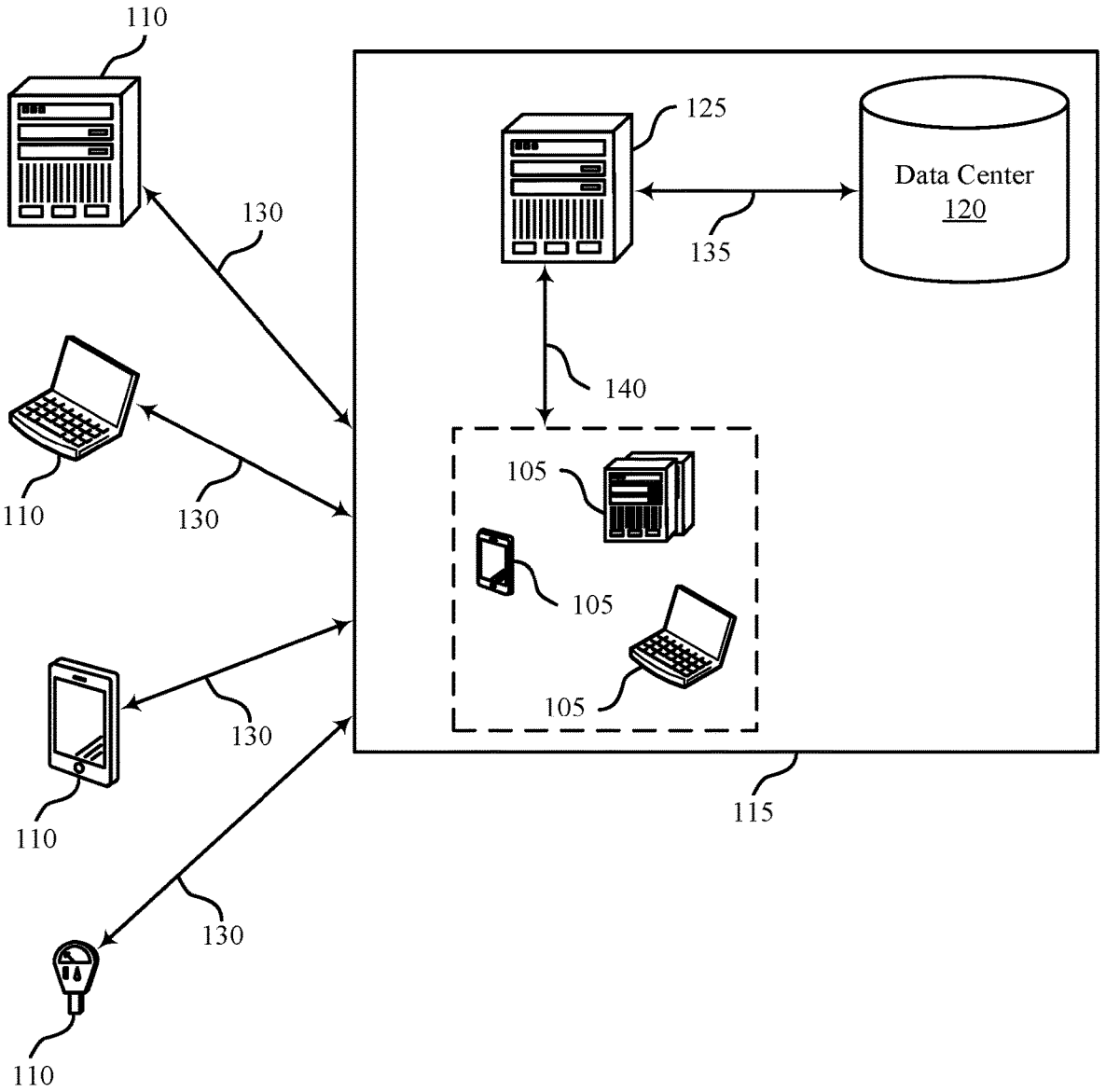
FIG. 1 illustrates an example of a computing system that supports hardware-backed password security for cloud systems in accordance with aspects of the present disclosure.

A multi-tenant cloud system may store and manage login credentials (such as usernames and passwords) for a large number of users. To ensure that sensitive account information (such as user configured passwords) are securely stored and protected, the multi-tenant cloud system may use cryptographic hashing, which involves the use of a mathematical function (also referred to as a hash function or a hashing algorithm) that takes an input (i.e., a clear text password) and produces a fixed-size output, such as a string of bytes. The purpose of password hashing is to prevent plain text passwords (equivalently referred to as clear text passwords) from being stored or transmitted within the multi-tenant cloud system, since plain text passwords are vulnerable to theft or misuse if compromised. Instead, the password may be transformed into a hash value, which is typically a fixed-length string of characters that is unique to the password input.

The same password input will always produce the same hash value, but it is computationally infeasible to reverse the process and obtain the original password from the resulting hash value. Storing hash values (instead of the plain text passwords themselves) in a database may improve the overall security of the database, as malicious actors (i.e., attackers) may be unable to access or extract plain text passwords from the database in the event of a data breach. However, if the database switches from one hashing algorithm/scheme to another, updating all existing hash values (without knowing the associated plain text passwords) may be computationally expensive, error-prone, and may leave the database susceptible to security breaches and/or denial of service (DOS) attacks.

The techniques described herein provide for using hardware-based encryption to securely store and access passwords within a multi-tenant cloud system. In accordance with one or more aspects of the present disclosure, a server host (such as an application server) may receive a login request that includes a clear text password for an account associated with a tenant of the multi-tenant cloud system. The server host may retrieve an encrypted payload associated with the account. The encrypted payload may include a hash value of a user-configured password for the account, an identifier of a hashing algorithm used to transform (i.e., hash) the user-configured password, or both. The server host may obtain a symmetric key wrapped with an asymmetric public key of the server host. The server host may transmit a request that includes the encrypted payload, the clear text password, and the wrapped symmetric key. The server host may receive a response that indicates whether a hash value of the clear text password corresponds to the hash value of the user configured password.

As used herein, the terms "wrapping" and "wrapped" refer to the cryptographic process of using symmetric encryption algorithms known as key wrap constructions to encapsulate (i.e., wrap) cryptographic key material. Although some implementations of the subject matter described in this disclosure can be accomplished using key wrapping techniques, it is to be understood that other approaches (such as key agreement approaches) can also be used to accomplish substantially the same result. For example, in accordance with a key agreement approach, two parties or systems may be associated with respective elliptic-curve key pair, and the two parties or systems may derive a shared secret using an anonymous key agreement scheme, such as an Elliptic Curve Diffie-Hellman (ECDH) Key Exchange scheme. The shared secret may be used as or as the basis of a key, such as the symmetric key described herein.

In some examples, the server host may obtain the symmetric key by transmitting, to a symmetric key distribution service, a request that includes the asymmetric public key of the server host and the symmetric key wrapped with an intermediate key provisioned by the symmetric key distribution service. The server host may receive, from the symmetric key distribution service, a response that includes the symmetric key wrapped with the asymmetric public key of the server host. In some examples, the server host may receive the user configured password (i.e., a plain text password) during a sign-up phase, provide the user configured password and the symmetric key (wrapped with the asymmetric public key of the server host) to a key protection component or sub-system of the server host, receive the encrypted payload from the key protection component, and store the encrypted pay load in a database.

Aspects of the present disclosure may be implemented to realize one or more of the following advantages. In some implementations, using a hardware-based encryption scheme to store passwords within a multi-tenant cloud system may reduce the likelihood of sensitive information (such as passwords) being stolen, compromised, intercepted, etc. Accordingly, the described techniques may improve the overall security of the multi-tenant cloud system by ensuring that passwords cannot be cracked (i.e., deciphered) by attackers. The techniques described herein may also promote greater resilience and scalability, as the same symmetric key can be used to securely encrypt a large number of individual passwords.

Aspects of the disclosure are initially described in the context of computing systems and process flows. Aspects of the disclosure are further illustrated by and described with reference to apparatus diagrams, system diagrams, and flowcharts that relate to hardware-backed password security for cloud systems.

FIG. 1 illustrates an example of a computing system 100 for cloud computing that supports hardware-backed password security for cloud systems in accordance with various aspects of the present disclosure. The computing system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server, a smartphone, or a laptop. In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction. The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server, a laptop, a smartphone, or a sensor. In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

A subsystem (e.g., pod) may include cloud clients 105, cloud platform 115, and data center 120. In some cases, data processing may occur at any of the components of a subsystem, or at a combination of these components. In some cases, servers may perform the data processing. The servers may be a cloud client 105 or located at data center 120.

The computing system 100 may be an example of a multi-tenant system. For example, the computing system 100 may store data and provide applications, solutions, or any other functionality for multiple tenants concurrently. A tenant may be an example of a group of users (e.g., an organization) associated with a same tenant identifier (ID) who share access. privileges, or both for the computing system 100. The computing system 100 may effectively separate data and processes for a first tenant from data and processes for other tenants using a system architecture, logic, or both that support secure multi-tenancy. In some examples, the computing system 100 may include or be an example of a multi-tenant database system. A multi-tenant database system may store data for different tenants in a single database or a single set of databases. For example, the multi-tenant database system may store data for multiple tenants within a single table (e.g., in different rows) of a database. To support multi-tenant security, the multi-tenant database system may prohibit (e.g., restrict) a first tenant from accessing. viewing, or interacting in any way with data or rows associated with a different tenant. As such, tenant data for the first tenant may be isolated (e.g., logically isolated) from tenant data for a second tenant, and the tenant data for the first tenant may be invisible (or otherwise transparent) to the second tenant. The multi-tenant database system may additionally use encryption techniques to further protect tenant-specific data from unauthorized access (e.g., by another tenant).

Additionally, or alternatively, the multi-tenant system may support multi-tenancy for software applications and infrastructure. In some cases, the multi-tenant system may maintain a single instance of a software application and architecture supporting the software application in order to serve multiple different tenants (e.g., organizations, customers). For example, multiple tenants may share the same software application, the same underlying architecture, the same resources (e.g., compute resources, memory resources), the same database, the same servers or cloud-based resources, or any combination thereof. For example, the computing system 100 may run a single instance of software on a processing device (e.g., a server, server cluster, virtual machine) to serve multiple tenants. Such a multi-tenant system may provide for efficient integrations (e.g., using application programming interfaces (APIs)) by applying the integrations to the same software application and underlying architectures supporting multiple tenants. In some cases, processing resources, memory resources, or both may be shared by multiple tenants.

As described herein, the computing system 100 may support any configuration for providing multi-tenant functionality. For example, the computing system 100 may organize resources (e.g., processing resources, memory resources) to support tenant isolation (e.g., tenant-specific resources), tenant isolation within a shared resource (e.g., within a single instance of a resource), tenant-specific resources in a resource group, tenant-specific resource groups corresponding to a same subscription, tenant-specific subscriptions, or any combination thereof. The computing system 100 may support scaling of tenants within the multi-tenant system, for example, using scale triggers, automatic scaling procedures, scaling requests, or any combination thereof. In some cases, the computing system 100 may implement one or more scaling rules to enable relatively fair sharing of resources across tenants. For example, a tenant may have a threshold quantity of processing resources, memory resources, or both to use, which in some cases may be tied to a subscription by the tenant.

As described herein, passwords may be hashed and stored. Hashing is a one-way function. A hashed password cannot be used to enter into an application's password field. Examples of hashing algorithms include SHA-256, SHA-512, password-based key derivation function (PBKDF2), etc. Storing passwords securely is a technical challenge. In some cases, the hashing scheme used to secure passwords may be surpassed by advancements in central processing unit (CPU) and/or graphic processing unit (GPU) updates. Some systems may use a password-based key derivation function (PBKDF) with a specific iteration count. As the iteration count increases, so do the computing costs associated with keeping the information secure.

Attackers crack (i.e., decipher) passwords by selecting a password that a victim (i.e., user) has chosen, calculating a hash value of the selected password, and comparing the calculated hash value to the hash value of the victim's password. If the two hashes match, the attacker has successfully cracked (e.g., determined) the plain text value of the victim's password. With high-speed custom hardware, such as graphic processing units (GPUs), and easy-to-rent hardware, the cost to an attacker is relatively small to successfully crack passwords, especially when inadequate precautions are taken.

Strong passwords stored with modern hashing algorithms and using effective hashing practices may deter attackers from cracking passwords. Application owner(s) may be responsible for selecting appropriate hashing algorithms. National Institute of Standards and Technology (NIST) and Open Web Application Security Project (OWASP) recommend using 1,300,000 iterations for PBKDF2-HMAC-SHA1, 600,000 iterations for PBKDF2-HMAC-SHA256, and 210,000 iterations for PBKDF2-HMAC-SHA512.

The techniques described herein generally provide for hashing any type of password (even weak passwords) using a hashing algorithm (such as SHA-512), encrypting the resulting hash value with a symmetric key (such as an Advanced Encryption Standard (AES) Galois/Counter mode (GCM)-256 key), and storing the encrypted hash value in the data center 120. Encryption of the hash value may be performed by a central processing unit (CPU) of an application server 125 (also referred to herein as a server host), such that the symmetric key is not present in the memory of the application server 125. The techniques described herein are fast, secure, and unbreakable provided all encryption and key wrapping algorithms and keys are secure.

The password encryption techniques described herein may use hardware backed by AES, and may provide one or more of the following advantages: better protection of password hashes using AES (as opposed to storing them hashed), constant time to password hashing, limited human access to hash passwords in the clear, commodity hardware-based password protection, and improved protection of passwords for home users, among other examples. Also, if an attacker steals encrypted passwords, they are unbreakable outside the service provider production infrastructure. Further, the described techniques may enable system administrators to change the current encryption scheme to a better (i.e., more secure) alternative without requiring user credentials, thereby promoting greater cryptographic agility.

In accordance with aspects of the present disclosure, a server host (such as the application server 125) may receive a login request that includes a clear text password for an account associated with a tenant of the multi-tenant cloud platform 115. The server host may retrieve, from the data center 120 associated with the multi-tenant cloud platform 115, an encrypted payload stored in association with the account. The encrypted payload may include a hash value of a user-configured password for the account and an indication of a hashing algorithm used to transform the user-configured password into the hash value. The server host may obtain a wrapped symmetric key provisioned by a symmetric key distribution service. The symmetric key may be wrapped using an asymmetric public key associated with the server host. The server host may transmit an API request that includes the encrypted payload retrieved from the data center 120, the clear text password extracted from the login request, and the wrapped symmetric key provisioned by the symmetric key distribution service. The server host may receive an API response that indicates whether a hash value of the clear text password from the login request corresponds to the hash value of the user-configured password for the account.

It should be appreciated by a person skilled in the art that one or more aspects of the disclosure may be implemented in a computing system 100 to solve problems other than those described above. Furthermore, aspects of the disclosure may provide technical improvements to "conventional" systems or processes as described herein. However, the description and appended drawings only include example technical improvements resulting from implementing aspects of the disclosure, and, accordingly, do not represent all of the technical improvements provided within the scope of the claims.

Figure 2A:
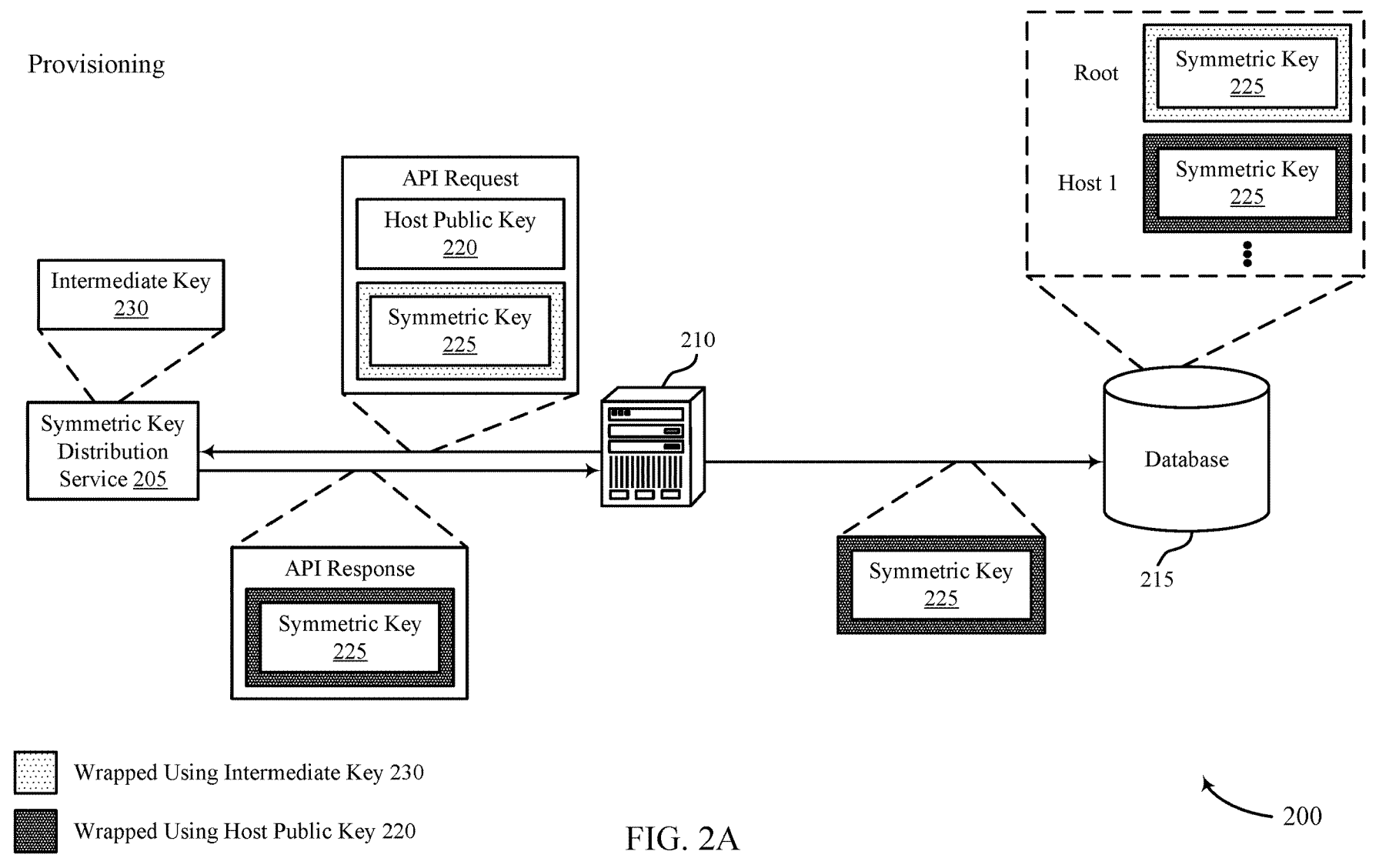
Figure 2B:
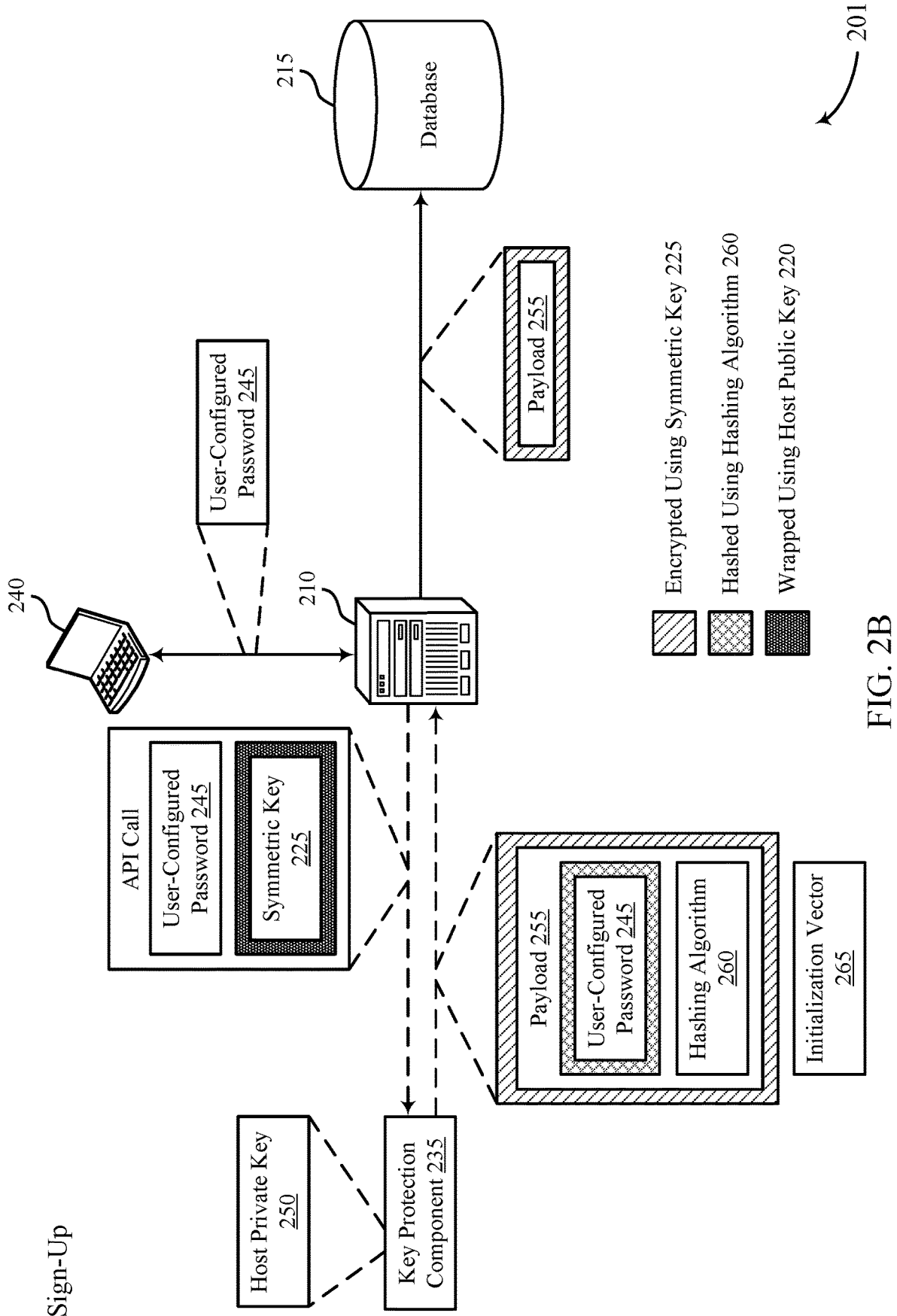
Figure 2C:
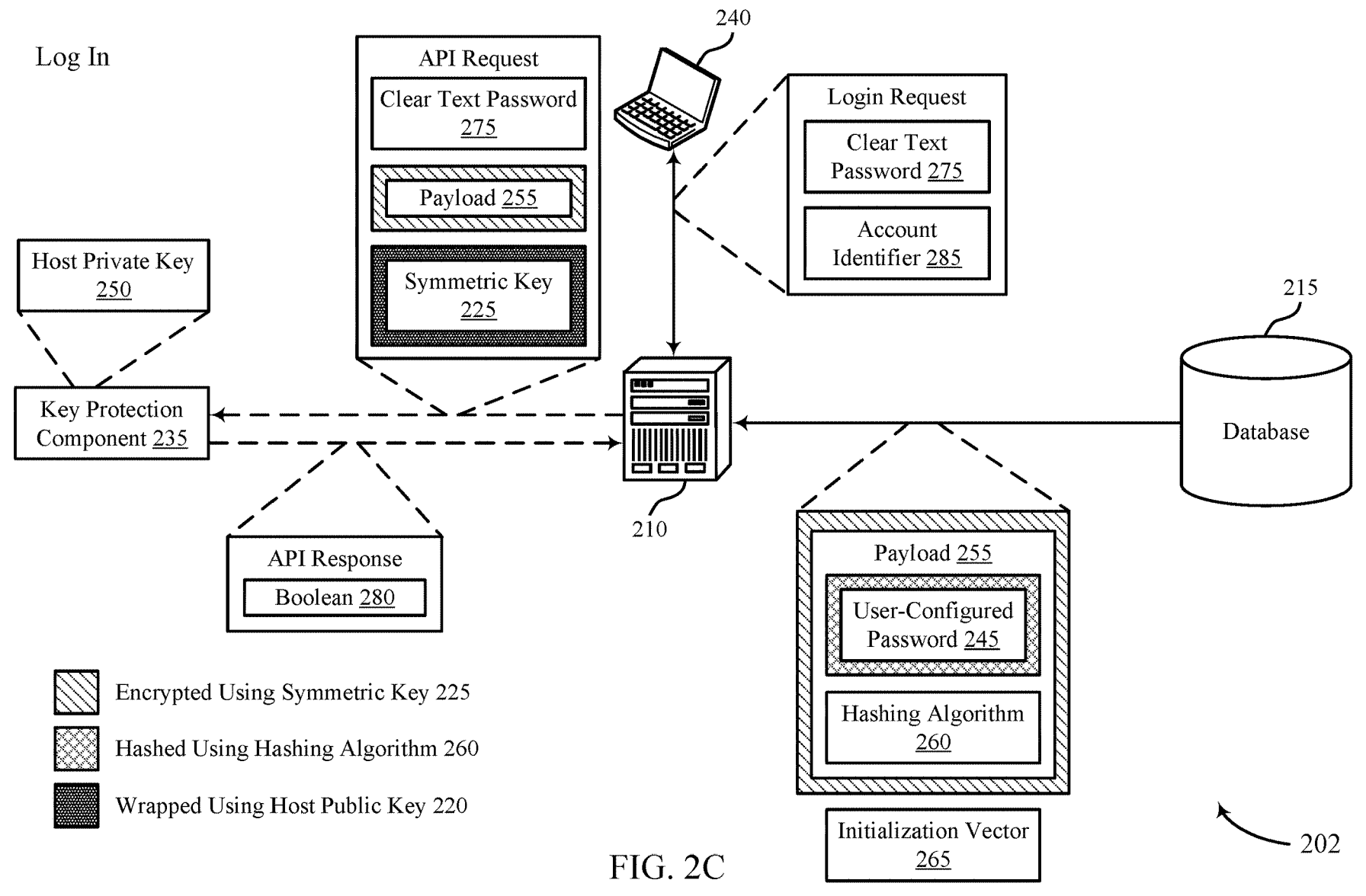

FIGS. 2A, 2B, and 2C show examples of a computing system 200, a computing system 201, and a computing system 202, respectively, that support hardware-backed password security for cloud systems in accordance with aspects of the present disclosure. The computing systems 200 through 202 may implement or be implemented by aspects of the computing system 100. For example, the computing system 200 includes a server host 210, which may be an example of aspects of the application server 125 described with reference to FIG. 1. Likewise, the computing system 201 includes a database 215, which may be an example of aspects of the data center 120, as shown and described with reference to FIG. 1.

The computing system 200 illustrates an example of a key provisioning process, whereby a symmetric key distribution service 205 unwraps, rewraps, and returns a symmetric key 225 to the server host 210. Initially, the symmetric key 225 may be wrapped with an intermediate key 230 (also referred to as a hardware security module (HSM) key) provisioned by the symmetric key distribution service 205. Only the symmetric key distribution service 205 has access to the intermediate key 230. The wrapped symmetric key 225 may be stored at the server host 210, the database 215, or both. The server host 210 may be configured with a host public key 220 (such as a Rivest-Shamir-Adleman (RSA) public key) and a corresponding host private key 250 (such as an RSA private key).

In the example of FIG. 2A, the server host 210 may transmit an API request that includes the host public key 220 (also referred to as the asymmetric public key of the server host 210) and the symmetric key 225 wrapped by the intermediate key 230 (denoted as $[Symmetric]_{Intermediate}$). The public key 220 may be included in a certificate of the server host 210. Upon receiving the API request, the symmetric key distribution service 205 may unwrap the symmetric key 225 using the intermediate key 230 known only to the symmetric key distribution service 205, rewrap the symmetric key 225 using the host public key 220, and include the rewrapped symmetric key 225 (denoted as $[Symmetric]_{Host\ Public}$) in an API response to the server host 210. In some implementations, the symmetric key distribution service 205 may verify the identity of the server host 210 and/or the authenticity of the host public key 220 before returning the rewrapped symmetric key 225 to the server host 210. Upon receiving the API response from the symmetric key distribution service 205, the server host 210 may, in some implementations, send the rewrapped symmetric key 225 to the database 215.

In third-party (3P) deployments, the server host 210 may call (i.e., invoke) the symmetric key distribution service 205 each time the wrapped symmetric key 225 is needed (e.g., each time a user signs up or logs in). In first-party (IP) deployments, the wrapped symmetric key 225 may be stored in the database 215, along with other instances of the symmetric key 225 wrapped with corresponding asymmetric public keys of other server hosts in a sub-system (i.e., pod) of the computing system 200. In other words, the database 215 may include a first instance of the symmetric key 225 wrapped with the intermediate key 230, a second instance of the symmetric key 225 wrapped with the host public key 220, a third instance of the symmetric key 225 wrapped with the public key of another server host, etc. Storing wrapped symmetric keys 225 in the database 215 may reduce the number of API calls made to the symmetric key distribution service 205, thereby resulting in lower signaling overhead and reduced latency.

The symmetric key distribution service 205 may be implemented as an HSM, a master host, or a quorum-based sharing service that uses a distributed key sharing scheme (such as a Shamir Secret Sharing scheme). The symmetric key distribution service 205 may enable the same key (such as the symmetric key 225) to be shared across different virtual and/or physical machines within the computing system 200. In some examples, the symmetric key distribution service 205 may be supported or otherwise provided by dedicated 1P hardware. For example, a first physical/virtual machine of a IP data center (such as the data center 120 described with reference to FIG. 1) may wrap, unwrap, and rewrap the symmetric key 225 using public keys of other physical/virtual machines in the network.

In other examples, two or more entities (such as machines or humans) supporting the symmetric key distribution service 205 may jointly create the symmetric key 225 in accordance with a quorum-based key sharing scheme, such as a Shamir secret sharing scheme or a multi-party computation (MPC)-based scheme. In a Shamir secret sharing scheme, the symmetric key 225 may be recreated using an M out of N scheme. That is, the entities supporting the symmetric key distribution service 205 may be unable to create (i.e., generate) the symmetric key 225 unless a threshold number (M) of the entities (N) are present for the creation of the symmetric key 225, as the key material (e.g., the information necessary to create the symmetric key 225) may be distributed across the entities in such a way that any one entity is unable to create or otherwise access the symmetric key 225. Once created, the symmetric key 225 can be loaded into entity 1, entity 2 can obtain the symmetric key 225 from entity 1, etc. An MPC-based scheme requires multiple parties to be involved in computing a cryptographic function. Other methods of creating/obtaining the symmetric key 225 are not precluded.

The computing system 201 of FIG. 2B illustrates an example of a sign-up process, whereby a key protection component 235 of the server host 210 hashes and encrypts a user configured password 245 provided by a user of a client device 240. To begin the sign-up process, the server host 210 may prompt the user to enter a password (e.g., via a user interface). Once the user enters the user configured password 245 (i.e., a plain text password), the server host 210 may obtain the symmetric key 225 (such as an AES key) that is wrapped with the host public key 220. The server host 210 may obtain the wrapped symmetric key 225 from the symmetric key distribution service 205 or the database 215, as described with reference to FIG. 2A.

Accordingly, the server host 210 may pass the user configured password 245 and the wrapped symmetric key 225 to the key protection component 235 via an API call. In some implementations, the key protection component 235 may support Intel® Quick Assist Technology (QAT), which includes Intel® Key Protection Technology (KPT), and these technologies may help accelerate data encryption and compression at the server host 210. For example, the key protection component 235 may provide hardware acceleration and CPU offloading capabilities for enhanced compression and decompression. The key protection component 235 may be implemented in hardware, software executed by at least one processor, firmware, or any combination thereof. Although the key protection component 235 is depicted as being separate from the server host 210, it is to be understood that the key protection component 235 may be physically integrated or co-located with other components of the server host 210. The key protection component 235 may have exclusive access to the host private key 250 (also referred to as the asymmetric private key of the server host 210), such that the host private key 250 is not stored or otherwise accessible in the memory of the server host 210. Upon receiving the API call, the key protection component 235 may use the host private key 250 to decrypt the wrapped symmetric key 225 (e.g., the symmetric key 225 wrapped with the host public key 220).

In turn, the key protection component 235 may select a hashing algorithm 260 (such as SHA-256, SHA-384, or SHA-512), hash the user configured password 245 using the selected hashing algorithm 260, include the hashed user configured password 245 and an indication of the selected hashing algorithm 260 in a payload 255, encrypt the payload 255 using the unwrapped symmetric key 225, and return the encrypted payload 255 to the server host 210. The key protection component 235 may also return an indication of an initialization vector 265 (such as a nonce) that was used to encrypt the payload 255. Upon receiving the encrypted payload 255, the server host 210 may store the encrypted payload 255 (along with the initialization vector 265) in the database 215. The encrypted payload 255 may be stored in association with the particular account for which the user configured password 245 was created.

The computing system 202 of FIG. 2C illustrates an example of a password verification process, whereby the key protection component 235 compares a clear text password 275 (entered by a user of the client device 240) to the user configured password 245 created during the provisioning process shown and described with reference to FIG. 2B. The password verification process may begin with the server host 210 receiving a login request from a user of the client device 240. The login request may include a clear text password 275 and an account identifier 285. Assuming the account identifier 285 is valid, the server host 210 may query the database 215 and retrieve an encrypted payload 255 stored in association with the account identifier 285. As described herein, the payload 255 may include a hash value of a user configured password 245 and an indication of a hashing algorithm 260 that was used to generate the hash value. The payload 255 may be encrypted with the symmetric key 225.

Accordingly, the server host 210 may obtain the wrapped symmetric key 225 (i.e., an instance of the symmetric key 225 that is wrapped with the host public key 220) from the database 215 or the symmetric key distribution service 205, as shown and described with reference to FIG. 2A. Once obtained, the server host 210 may provide the wrapped symmetric key 225, the encrypted payload 255, and the clear text password 275 (from the login request) to the key protection component 235 (e.g., via an API call). As described with reference to FIG. 2B, the key protection component 235 may be physically integrated or co-located with other components of the server host 210, and may have exclusive access to the host private key 250.

Upon receiving the clear text password 275, the encrypted payload 255 (along with the initialization vector 265 used to encrypt the payload 255), and the wrapped symmetric key 225 from the server host 210, the key protection component 235 may use the host private key 250 to unwrap (i.e., decrypt) the wrapped symmetric key 225. Thereafter, the key protection component 235 may use the symmetric key 225 and the initialization vector 265 to decrypt the encrypted payload 255, thereby enabling the key protection component 235 to access the hash value of the user configured password 245 and the hashing algorithm 260.

The key protection component 235 may hash the clear text password 275 using the indicated hashing algorithm 260, and may compare the resulting hash value to the hash value of the user configured password 245. The key protection component 235 may return (e.g., via an API response) a Boolean 280 indicating a result of the comparison. If the two hash values match (i.e., are equivalent), the Boolean 280 may indicate a first value (e.g., True). Otherwise, the Boolean may indicate a second value (e.g., False). If the Boolean 280 is True, the server host 210 may approve the login request. If the Boolean is False, the server host 210 may deny the login request.

Figure 3A:
FIGS. 3A, 3B, and 3C show examples of process flows that support hardware-backed password security for cloud systems in accordance with aspects of the present disclosure.
Figure 3B:
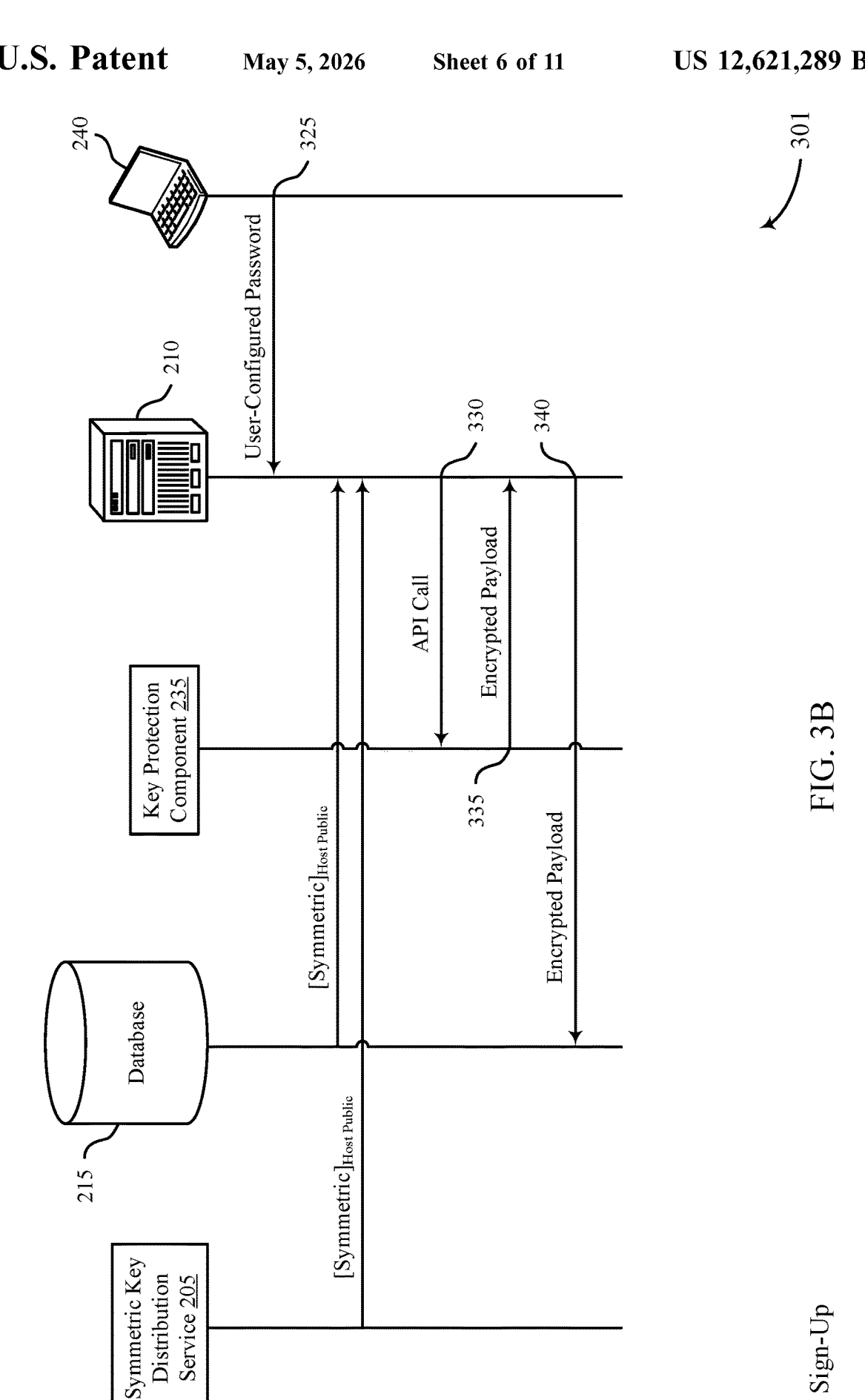
Figure 3C:
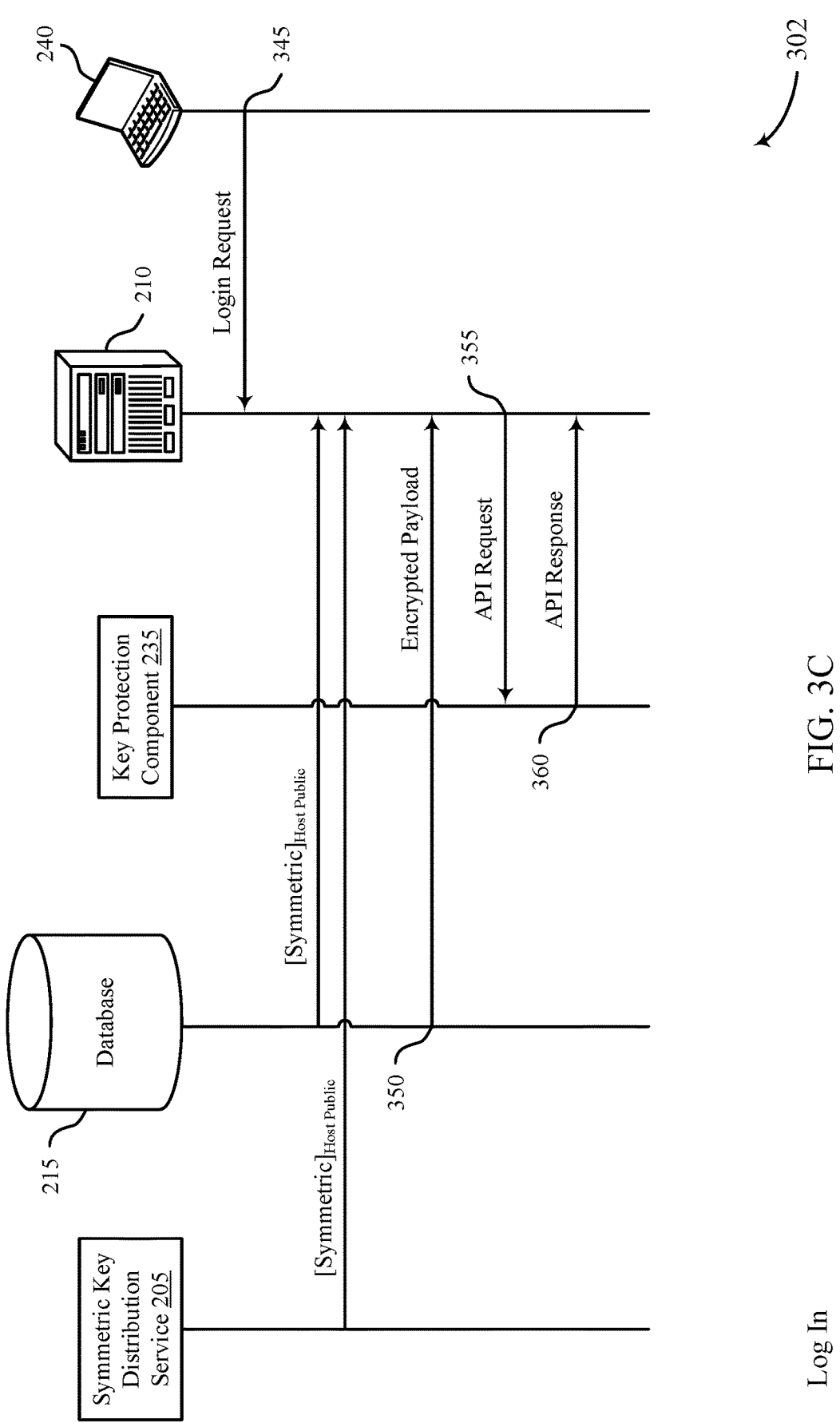

FIGS. 3A, 3B, and 3C show examples of a process flow 300, a process flow 301, and a process flow 302, respectively, that support hardware-backed password security for cloud systems in accordance with aspects of the present disclosure. The process flows 300 through 302 may implement or be implemented by aspects of any of the computing systems 100 through 202. For example, the process flow 300 includes a server host 210 and a database 215, which may be examples of corresponding elements described herein, including with reference to FIGS. 2A through 2C. In the following description of the process flows 300 through 302, operations may be added, omitted, or performed in a different order (with respect to the exemplary order shown).

The process flow 300 of FIG. 3A illustrates an example of a key provisioning process, whereby a symmetric key distribution service 205 unwraps, rewraps, and returns a symmetric key 225 to the server host 210. Initially, the symmetric key 225 may be wrapped with an intermediate key 230 (also referred to as an HSM key) provisioned by the symmetric key distribution service 205. Only the symmetric key distribution service 205 has access to the intermediate key 230. At 305, the wrapped symmetric key 225 (denoted as $[Symmetric]_{Intermediate}$) may be stored at the server host 210, the database 215, or both. The server host 210 may be configured with a host public key 220 (such as an RSA public key) and a corresponding host private key 250 (such as an RSA private key).

At 310, the server host 210 may transmit an API request that includes the host public key 220 (also referred to as the asymmetric public key of the server host 210) and the symmetric key 225 wrapped by the intermediate key 230 (denoted as $[Symmetric]_{Intermediate}$). Upon receiving the API request, the symmetric key distribution service 205 may unwrap the symmetric key 225 using the intermediate key 230 known only to the symmetric key distribution service 205, rewrap the symmetric key 225 using the host public key 220, and send the rewrapped symmetric key 225 (denoted as [Symmetric] Host Public) to the server host 210. In some implementations, the symmetric key distribution service 205 may verify the identity of the server host 210 before returning the rewrapped symmetric key 225 to the server host 210 at 315. At 320, the server host 210 may, in some implementations, store the rewrapped symmetric key 225 in the database 215.

In 3P deployments, the server host 210 may call (i.e., invoke) the symmetric key distribution service 205 each time the wrapped symmetric key 225 is needed (e.g., each time a user signs up or logs in). In IP deployments, the wrapped symmetric key 225 may be stored in the database 215, along with other instances of the symmetric key 225 wrapped with corresponding asymmetric public keys of other server hosts in a sub-system (i.e., pod) of the computing system 200. In other words, the database 215 may include a first instance of the symmetric key 225 wrapped with the intermediate key 230, a second instance of the symmetric key 225 wrapped with the host public key 220 of the server host 210, a third instance of the symmetric key 225 wrapped with the public key of another server host, etc. Storing wrapped symmetric keys 225 in the database 215 may reduce the number of API calls made to the symmetric key distribution service 205, thereby resulting in lower signaling overhead and reduced latency, while minimizing dependency on SKDS to improve overall efficiency.

As described herein, the symmetric key distribution service 205 may be implemented as an HSM, a master host, or a quorum-based sharing service that uses a distributed key sharing scheme (such as a Shamir Secret Sharing scheme). The symmetric key distribution service 205 may enable the same key (such as the symmetric key 225) to be shared across different virtual and/or physical machines within the computing system 200. In some examples (e.g., for 1P deployments), the symmetric key distribution service 205 may be supported or otherwise provided by dedicated 1P hardware. For example, a first physical/virtual machine of a 1P data center may wrap, unwrap, and rewrap the symmetric key 225 using public keys of other physical/virtual machines in the network.

In other examples, two or more machines supporting the symmetric key distribution service 205 with may jointly create the symmetric key 225 in accordance with a quorum-based key sharing scheme. The machines supporting the symmetric key distribution service 205 may be unable to create or use the symmetric key 225 unless a threshold number (M) of the machines (N) are present for the creation of the symmetric key 225, as the key material (e.g., the information necessary to create the symmetric key 225) may be distributed across the machines in such a way that any one machine is unable to create the symmetric key 225 alone. Once created, the symmetric key 225 can be loaded into machine 1, machine 2can obtain the symmetric key 225 from machine 1, etc. Other methods of creating/deriving the symmetric key 225 are not precluded.

The process flow 301 of FIG. 3B illustrates an example of a sign-up process, whereby a key protection component 235 of the server host 210 hashes and encrypts a user configured password 245 provided by a user of a client device 240. To begin the sign-up process, the server host 210 may prompt the user to enter a password (e.g., via a user interface). Once the user enters the user configured password 245 (i.e., a plain text password) at 325, the server host 210 may obtain the symmetric key 225 (such as an AES key) that is wrapped with the host public key 220. As depicted in the example of FIG. 3B, the server host 210 may obtain the wrapped symmetric key 225 from the symmetric key distribution service 205 or the database 215.

At 330, the server host 210 may pass the user configured password 245 and the wrapped symmetric key 225 to the key protection component 235 (e.g., via an API call). Although the key protection component 235 is depicted as being separate from the server host 210, it is to be understood that the key protection component 235 may be physically integrated or co-located with other components of the server host 210. The key protection component 235 may have exclusive access to the host private key 250 (also referred to as the asymmetric private key of the server host 210), such that the host private key 250 is not stored or otherwise accessible in the memory of the server host 210. Upon receiving the API call, the key protection component 235 may use the host private key 250 of the server host 210 to decrypt the wrapped symmetric key 225 (e.g., the symmetric key 225 wrapped with the host public key 220).

In turn, the key protection component 235 may select a hashing algorithm 260 (such as SHA-256, SHA-384, or SHA-512), hash the user configured password 245 using the selected hashing algorithm 260, include the hashed user configured password 245 and an indication of the selected hashing algorithm 260 in a payload 255, encrypt the payload 255 using the unwrapped symmetric key 225, and return the encrypted payload 255 to the server host 210 at 335. The key protection component 235 may also return an indication of an initialization vector 265 (such as a nonce) that was used to encrypt the payload 255. At 340, the server host 210 may store the encrypted payload 255 (along with the initialization vector 265) in the database 215. The encrypted payload 255 may be stored in association with the particular account for which the user configured password 245 was created.

The process flow 302 of FIG. 3C illustrates an example of a password verification process, whereby the key protection component 235 compares a clear text password 275 (entered by a user of the client device 240) to the user configured password 245 created during the sign-up process shown and described with reference to FIG. 3B. The password verification process may begin at 345, with the server host 210 receiving a login request from a user of the client device 240. The login request may include a clear text password 275 and an account identifier 285. At 350, the server host 210 may query the database 215 and retrieve an encrypted payload 255 stored in association with the account identifier 285. As described herein, the payload 255 may include a hash value of a user configured password 245 and an indication of a hashing algorithm 260 that was used to generate the hash value. The payload 255 may be encrypted with the symmetric key 225.

Accordingly, the server host 210 may obtain the wrapped symmetric key 225 (i.e., an instance of the symmetric key 225 that is wrapped with the host public key 220) from the database 215 or the symmetric key distribution service 205, as shown and described with reference to FIG. 3A. At 355, the server host 210 may provide the wrapped symmetric key 225, the encrypted payload 255, and the clear text password 275 (from the login request) to the key protection component 235 (e.g., via an API call). As described with reference to FIG. 3B, the key protection component 235 may be physically integrated or co-located with other components of the server host 210, and may have exclusive access to the host private key 250.

Upon receiving the clear text password 275, the encrypted payload 255 (along with the initialization vector 265 used to encrypt the payload 255), and the wrapped symmetric key 225 from the server host 210, the key protection component 235 may use the host private key 250 to unwrap (i.e., decrypt) the wrapped symmetric key 225. Thereafter, the key protection component 235 may use the symmetric key 225 and the initialization vector 265 to decrypt the encrypted payload 255, thereby enabling the key protection component 235 to access the hash value of the user configured password 245 and the hashing algorithm 260.

The key protection component 235 may hash the clear text password 275 using the indicated hashing algorithm 260, and may compare the resulting hash value to the hash value of the user configured password 245. At 360, the key protection component 235 may return (e.g., via an API response) a Boolean 280 indicating a result of the comparison. If the two hash values match (i.e., are equivalent), the Boolean 280 may indicate a first value (e.g., True). Otherwise, the Boolean may indicate a second value (e.g., False). If the Boolean 280 is True, the server host 210 may approve the login request. If the Boolean is False, the server host 210 may deny the login request.

Figure 4:
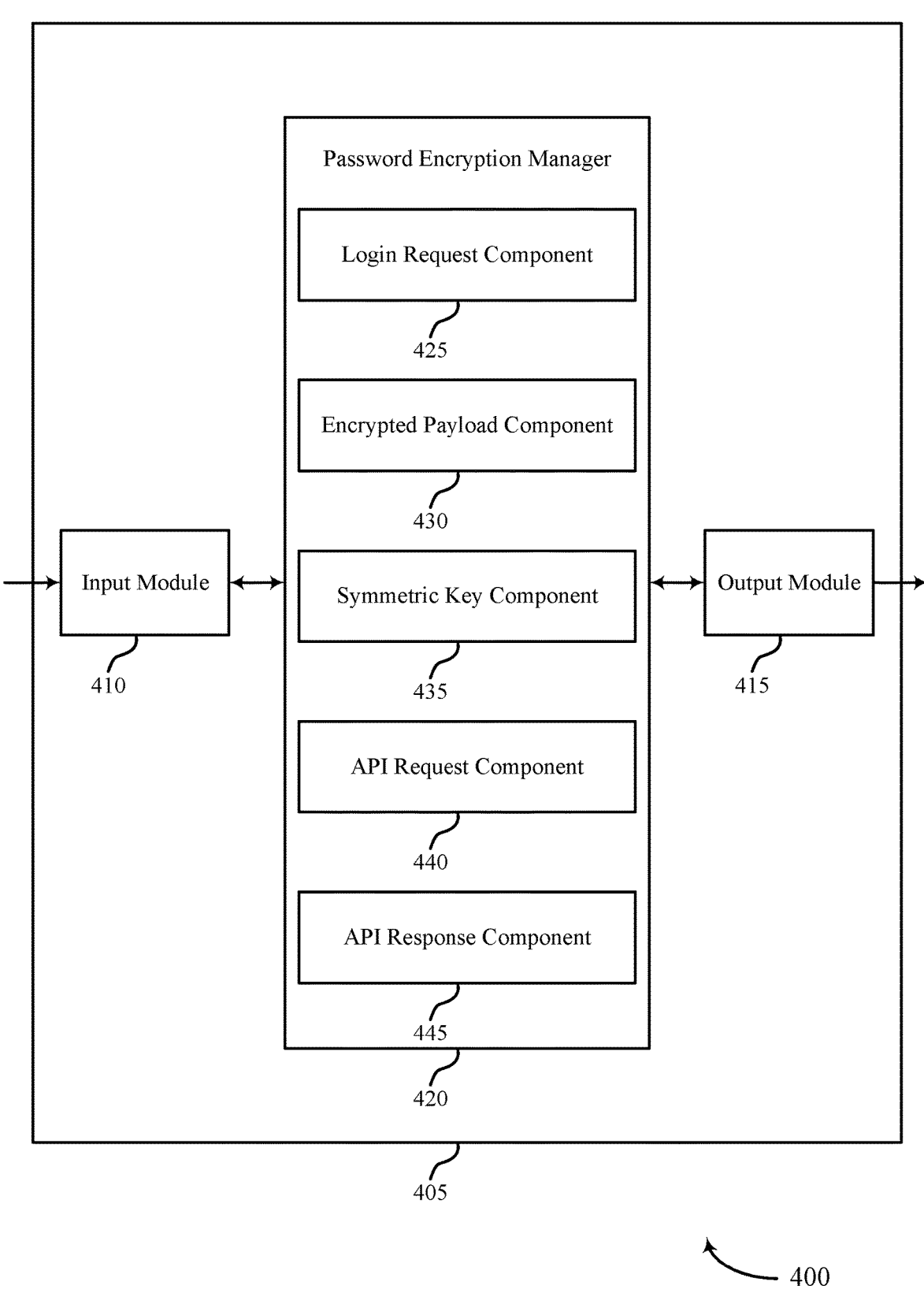
FIG. 4 shows a block diagram of an apparatus that supports hardware-backed password security for cloud systems in accordance with aspects of the present disclosure.

FIG. 4 shows a block diagram 400 of a device 405 that supports hardware-backed password security for cloud systems in accordance with aspects of the present disclosure. The device 405 may include an input module 410, an output module 415, and a password encryption manager 420. The device 405, or one of more components of the device 405 (e.g., the input module 410, the output module 415, and the password encryption manager 420), may include at least one processor, which may be coupled with at least one memory, to support the described techniques. Each of these components may be in communication with one another (e.g., via one or more buses).

The input module 410 may manage input signals for the device 405. For example, the input module 410 may identify input signals based on an interaction with a modem, a keyboard, a mouse, a touchscreen, or a similar device. These input signals may be associated with user input or processing at other components or devices. In some cases, the input module 410 may utilize an operating system such as iOS®, ANDROID®, MS-DOS®, MS-WINDOWS®, OS/2®, UNIX®, LINUX®, or another known operating system to handle input signals. The input module 410 may send aspects of these input signals to other components of the device 405 for processing. For example, the input module 410 may transmit input signals to the password encryption manager 420 to support hardware-backed password security for cloud systems. In some cases, the input module 410 may be a component of an I/O controller 610, as described with reference to FIG. 6.

The output module 415 may manage output signals for the device 405. For example, the output module 415 may receive signals from other components of the device 405, such as the password encryption manager 420, and may transmit these signals to other components or devices. In some examples, the output module 415 may transmit output signals for display in a user interface, for storage in a database or data store, for further processing at a server or server cluster, or for any other processes at any number of devices or systems. In some cases, the output module 415 may be a component of an I/O controller 610 as described with reference to FIG. 6.

For example, the password encryption manager 420 may include a login request component 425, an encrypted payload component 430, a symmetric key component 435, an API request component 440, an API response component 445, or any combination thereof. In some examples, the password encryption manager 420, or various components thereof, may be configured to perform various operations (e.g., receiving, monitoring, transmitting) using or otherwise in cooperation with the input module 410, the output module 415, or both. For example, the password encryption manager 420 may receive information from the input module 410, send information to the output module 415, or be integrated in combination with the input module 410, the output module 415, or both to receive information, transmit information, or perform various other operations as described herein.

The password encryption manager 420 may support data processing in accordance with examples disclosed herein. The login request component 425 may be configured to support receiving, at a server host, a login request that includes a clear text password for an account associated with a tenant of a multi-tenant cloud platform. The encrypted payload component 430 may be configured to support retrieving, from a database associated with the multi-tenant cloud platform, an encrypted payload stored in association with the account, the encrypted payload including a hash value of a user-configured password for the account and an indication of a hashing algorithm used to transform the user-configured password into the hash value. The symmetric key component 435 may be configured to support obtaining a wrapped symmetric key provisioned by a symmetric key distribution service, where the symmetric key is wrapped using an asymmetric public key associated with the server host. The API request component 440 may be configured to support transmitting an API request that includes the encrypted payload retrieved from the database, the clear text password extracted from the login request, and the wrapped symmetric key provisioned by the symmetric key distribution service. The API response component 445 may be configured to support receiving an API response that indicates whether a hash value of the clear text password from the login request corresponds to the hash value of the user-configured password for the account.

Figure 5:
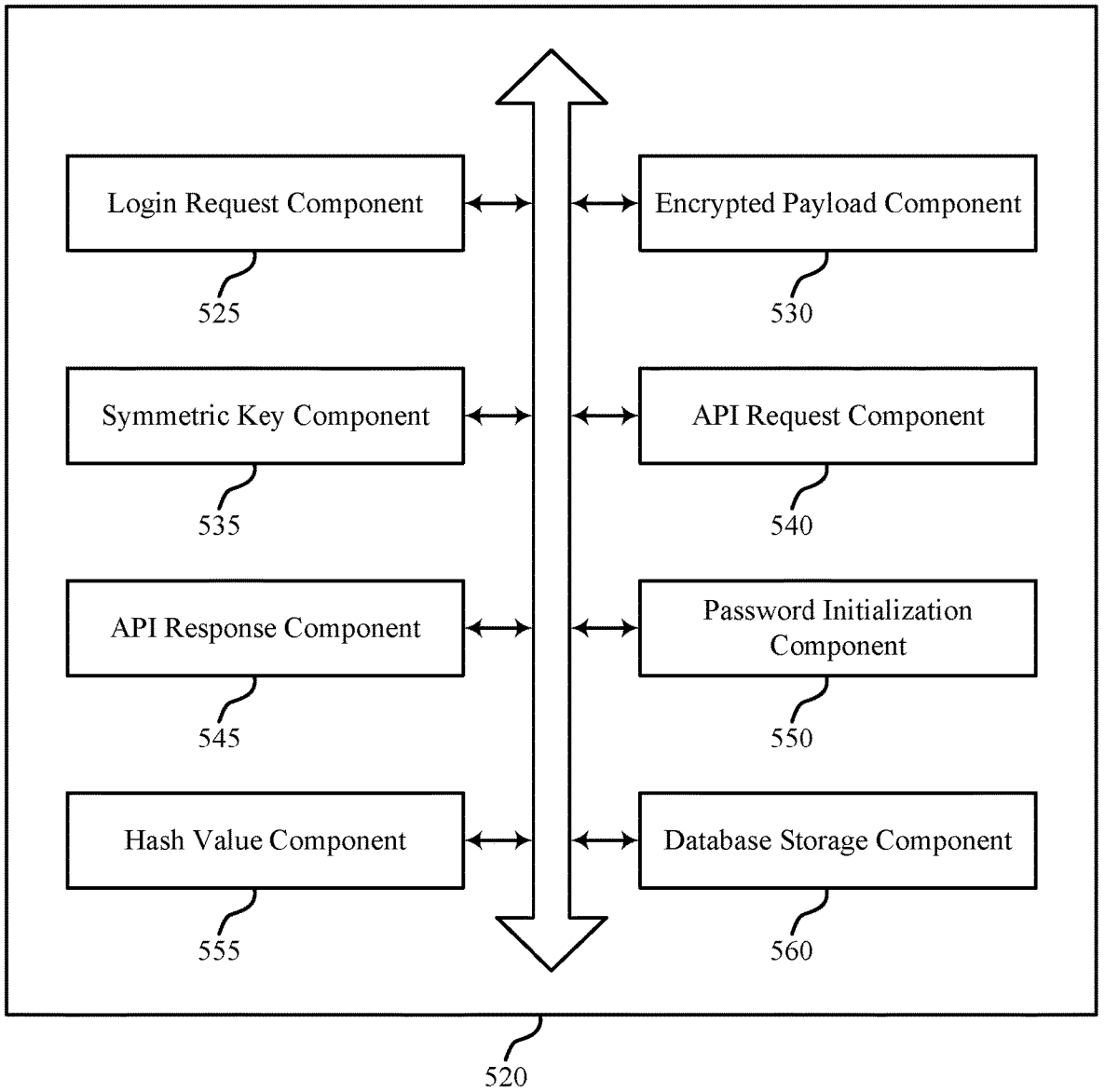
FIG. 5 shows a block diagram of a password encryption manager that supports hardware-backed password security for cloud systems in accordance with aspects of the present disclosure.

FIG. 5 shows a block diagram 500 of a password encryption manager 520 that supports hardware-backed password security for cloud systems in accordance with aspects of the present disclosure. The password encryption manager 520 may be an example of aspects of a password encryption manager or a password encryption manager 420, or both, as described herein. The password encryption manager 520, or various components thereof, may be an example of means for performing various aspects of the techniques described herein. For example, the password encryption manager 520 may include a login request component 525. an encrypted payload component 530, a symmetric key component 535, an API request component 540), an API response component 545, a password initialization component 550, a hash value component 555, a database storage component 560, or any combination thereof. Each of these components, or components of sub-components thereof (e.g., one or more processors, one or more memories), may communicate, directly or indirectly, with one another (e.g., via one or more buses).

The password encryption manager 520 may support data processing in accordance with examples disclosed herein. The login request component 525 may be configured to support receiving, at a server host, a login request that includes a clear text password for an account associated with a tenant of a multi-tenant cloud platform. The encrypted payload component 530 may be configured to support retrieving. from a database associated with the multi-tenant cloud platform, an encrypted payload stored in association with the account, the encrypted payload including a hash value of a user-configured password for the account and an indication of a hashing algorithm used to transform the user-configured password into the hash value. The symmetric key component 535 may be configured to support obtaining a wrapped symmetric key provisioned by a symmetric key distribution service, where the symmetric key is wrapped using an asymmetric public key associated with the server host. The API request component 540 may be configured to support transmitting an API request that includes the encrypted payload retrieved from the database, the clear text password extracted from the login request, and the wrapped symmetric key provisioned by the symmetric key distribution service. The API response component 545 may be configured to support receiving an API response that indicates whether a hash value of the clear text password from the login request corresponds to the hash value of the user-configured password for the account.

In some examples, the password initialization component 550 may be configured to support transmitting, to a key protection component of the server host, a message indicating the user-configured password and the wrapped symmetric key. In some examples, the encrypted pay load component 530 may be configured to support receiving, from the key protection component and in response to the message, the encrypted payload and an initialization vector associated with the encrypted payload.

In some examples, the message may be configured to cause the key protection component to unwrap the symmetric key using an asymmetric private key corresponding to the asymmetric public key of the server host, transform the user-configured password into the hash value using the hashing algorithm, generate the payload including the hash value and the indication of the hashing algorithm, encrypt the payload using the unwrapped symmetric key and the initialization vector, and return the encrypted payload to the server host along with the initialization vector.

In some examples, the database storage component 560 may be configured to support storing, within the database, the encrypted payload and the initialization vector in association with the account. In some examples, the encrypted payload component 530 may be configured to support retrieving the encrypted pay load and the initialization vector from the database in response to the login request. In some examples, the API request component 540 may be configured to support including the encrypted payload and the initialization vector in the API request.

In some examples, the hashing algorithm used to transform the user-configured password into the hash value is selected by the key protection component. In some examples, the wrapped symmetric key is provisioned by a symmetric key distribution service that includes at least one of an HSM, or a master host, or a quorum-based key sharing service.

In some examples, the API request may be configured to cause a key protection component of the server host to unwrap the symmetric key using an asymmetric private key corresponding to the asymmetric public key of the server host, decrypt the payload using the unwrapped symmetric key and an initialization vector associated with the payload, generate a hash value of the clear text password from the login request using the hashing algorithm indicated by the decrypted payload, and compare the hash value of the clear text password to the hash value of the user-configured password indicated by the decrypted payload.

In some examples, to support obtaining the wrapped symmetric key, the symmetric key component 535 may be configured to support transmitting, to a symmetric key distribution service associated with the multi-tenant cloud platform, a first message indicating the asymmetric public key of the server host and the symmetric key that is wrapped using an intermediate key provisioned by the symmetric key distribution service. In some examples, to support obtaining the wrapped symmetric key, the symmetric key component 535 may be configured to support receiving, from the symmetric key distribution service, a second message indicating the symmetric key that is wrapped using the asymmetric public key associated with the server host.

In some examples, the first message may be configured to cause the symmetric key distribution service to unwrap the symmetric key using the intermediate key provisioned by the symmetric key distribution service, rewrap the symmetric key using the asymmetric public key of the server host, and return the rewrapped symmetric key to the server host via the second message.

In some examples, the database storage component 560 may be configured to support storing, within the database, the symmetric key that is wrapped using the intermediate key provisioned by the symmetric key distribution service.

In some examples, to support obtaining the symmetric key, the symmetric key component 535 may be configured to support retrieving, from the database, the symmetric key that is wrapped using the asymmetric public key associated with the server host, where the database includes two or more instances of the symmetric key that are wrapped using respective asymmetric public keys associated with other server hosts in a sub-system of the multi-tenant cloud platform that includes the server host and the database.

In some examples, the user-configured password is locally hashed and encrypted by a key protection component of the server host. In some examples, the hashing algorithm is SHA-256, SHA-384, SHA-512, or a Keccak algorithm.

In some examples, the API response includes a Boolean to indicate whether a hash value of the clear text password from the login request corresponds to the hash value of the user-configured password for the account. In some examples, the symmetric key is provisioned for a sub-system of the multi-tenant cloud platform that includes server host and the database.

Figure 6:
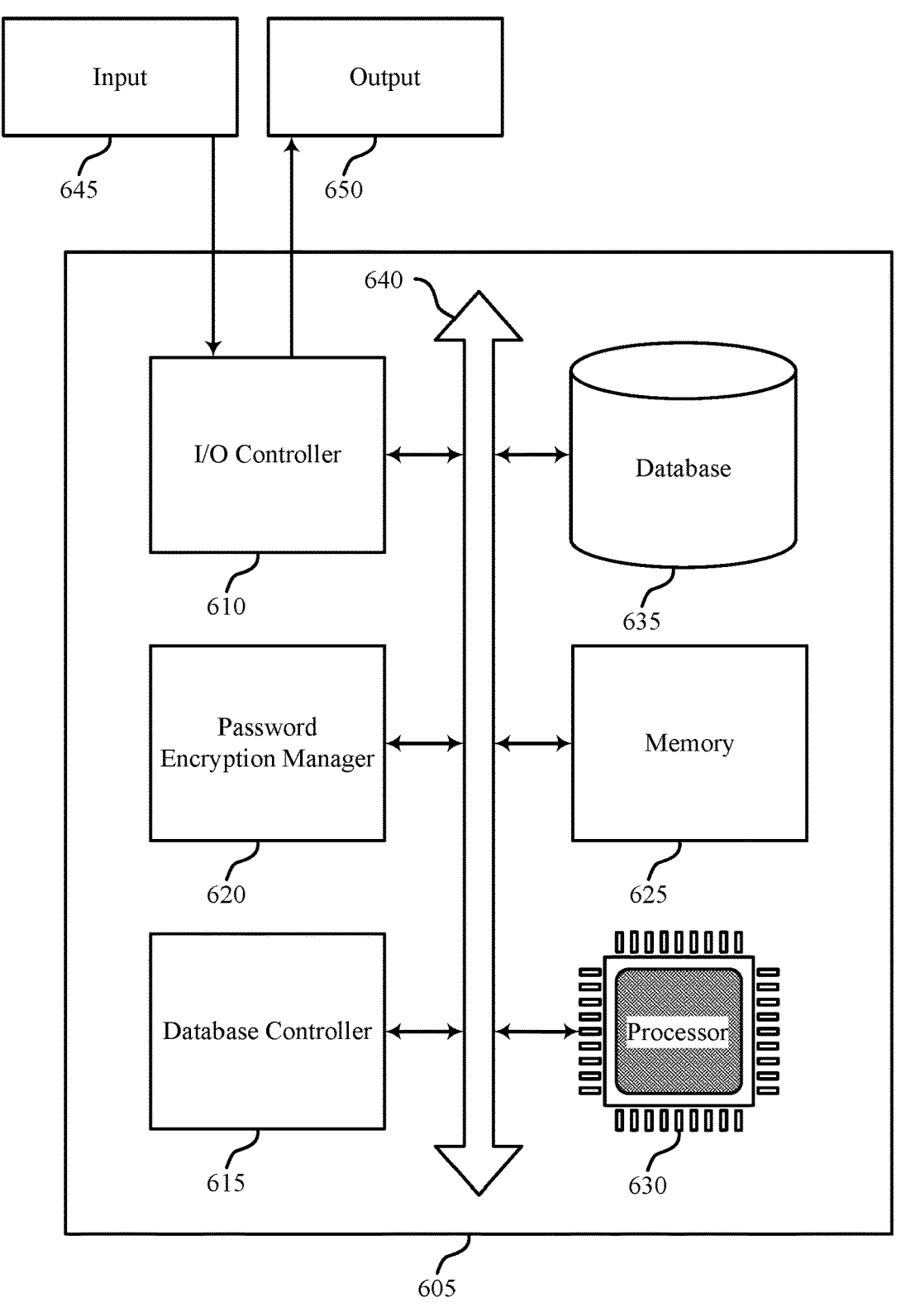
FIG. 6 shows a diagram of a system including a device that supports hardware-backed password security for cloud systems in accordance with aspects of the present disclosure.

FIG. 6 shows a diagram of a system 600 including a device 605 that supports hardware-backed password security for cloud systems in accordance with aspects of the present disclosure. The device 605 may be an example of or include the components of a device 405, as described herein. The device 605 may include components for data communications, including components for transmitting and receiving communications, such as a password encryption manager 620, an I/O controller 610, a database controller 615, at least one memory 625, at least one processor 630, and a database 635. These components may be in electronic communication or otherwise coupled (e.g., operatively, communicatively, functionally, electronically, electrically) via one or more buses (e.g., a bus 640).

The I/O controller 610 may manage input signals 645 and output signals 650 for the device 605. The I/O controller 610 may also manage peripherals not integrated into the device 605. In some cases, the I/O controller 610 may represent a physical connection or port to an external peripheral. In some cases, the I/O controller 610 may utilize an operating system such as iOS®, ANDROID®, MS-DOS®, MS-WINDOWS®, OS/2®, UNIX®, LINUX®, or another known operating system. In other cases, the I/O controller 610 may represent or interact with a modem, a keyboard, a mouse, a touchscreen, or a similar device. In some cases, the I/O controller 610 may be implemented as part of at least one processor 630. In some examples, a user may interact with the device 605 via the I/O controller 610 or via hardware components controlled by the I/O controller 610.

The database controller 615 may manage data storage and processing in a database 635. In some cases, a user may interact with the database controller 615. In other cases, the database controller 615 may operate automatically without user interaction. The database 635 may be an example of a single database, a distributed database, multiple distributed databases, a data store, a data lake, or an emergency backup database.

At least one memory 625 may include random-access memory (RAM) and ROM. The memory 625 may store computer-readable, computer-executable software including instructions that, when executed, cause the at least one processor 630 to perform various functions described herein. In some cases, the at least one memory 625 may contain, among other things, a BIOS which may control basic hardware or software operation such as the interaction with peripheral components or devices.

The at least one processor 630 may include an intelligent hardware device, (e.g., a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). In some cases, the at least one processor 630 may be configured to operate a memory array using a memory controller. In other cases, a memory controller may be integrated into the at least one processor 630. The at least one processor 630 may be configured to execute computer-readable instructions stored in at least one memory 625 to perform various functions (e.g., functions or tasks supporting hardware-backed password security for cloud systems).

The password encryption manager 620 may support data processing in accordance with examples disclosed herein. For example, the password encryption manager 620 may be configured to support receiving, at a server host, a login request that includes a clear text password for an account associated with a tenant of a multi-tenant cloud platform. The password encryption manager 620 may be configured to support retrieving, from a database associated with the multi-tenant cloud platform, an encrypted payload stored in association with the account, the encrypted payload including a hash value of a user-configured password for the account and an indication of a hashing algorithm used to transform the user-configured password into the hash value. The password encryption manager 620 may be configured to support obtaining a wrapped symmetric key provisioned by a symmetric key distribution service, where the symmetric key is wrapped using an asymmetric public key associated with the server host. The password encryption manager 620 may be configured to support transmitting an API request that includes the encrypted payload retrieved from the database, the clear text password extracted from the login request, and the wrapped symmetric key provisioned by the symmetric key distribution service. The password encryption manager 620 may be configured to support receiving an API response that indicates whether a hash value of the clear text password from the login request corresponds to the hash value of the user-configured password for the account.

Configuring the password encryption manager 620 to store and manage passwords in accordance with the hardware-based encryption scheme(s) described herein may reduce the likelihood of sensitive information (such as passwords) being stolen, compromised, intercepted, etc. Accordingly, the described techniques may improve the overall security of the device 605 by ensuring that passwords cannot be cracked (i.e., deciphered) by attackers. The techniques described herein may also promote greater resilience and scalability, as the same symmetric key can be used to securely encrypt a large number of individual passwords.

FIG. 7 shows a flowchart illustrating a method 700 that supports hardware-backed password security for cloud systems in accordance with aspects of the present disclosure. The operations of the method 700 may be implemented by a computing system or components thereof. For example, the operations of the method 700 may be performed by aspects of any of the computing systems described with reference to FIGS. 2A through 3C. In some examples, the computing system may execute a set of instructions to control the functional elements of the computing system to perform the described functions. Additionally, or alternatively, the computing system may perform aspects of the described functions using special-purpose hardware.

At 705, the method 700 may include receiving, at a server host, a login request that includes a clear text password for an account associated with a tenant of a multi-tenant cloud platform. The operations of 705 may be performed in accordance with examples disclosed herein. In some examples, aspects of the operations of 705 may be performed by a login request component 525, as described with reference to FIG. 5.

At 710, the method 700 may include retrieving, from a database associated with the multi-tenant cloud platform, an encrypted payload stored in association with the account, the encrypted payload including a hash value of a user-configured password for the account and an indication of a hashing algorithm used to transform the user-configured password into the hash value. The operations of 710 may be performed in accordance with examples disclosed herein. In some examples, aspects of the operations of 710 may be performed by an encrypted payload component 530, as described with reference to FIG. 5.

At 715, the method 700 may include obtaining a wrapped symmetric key provisioned by a symmetric key distribution service, where the symmetric key is wrapped using an asymmetric public key associated with the server host. The operations of 715 may be performed in accordance with examples disclosed herein. In some examples, aspects of the operations of 715 may be performed by a symmetric key component 535, as described with reference to FIG. 5.

At 720, the method 700 may include transmitting an API request that includes the encrypted payload retrieved from the database, the clear text password extracted from the login request, and the wrapped symmetric key provisioned by the symmetric key distribution service. The operations of 720 may be performed in accordance with examples disclosed herein. In some examples, aspects of the operations of 720 may be performed by an API request component 540, as described with reference to FIG. 5.

At 725, the method 700 may include receiving an API response that indicates whether a hash value of the clear text password from the login request corresponds to the hash value of the user-configured password for the account. The operations of 725 may be performed in accordance with examples disclosed herein. In some examples, aspects of the operations of 725 may be performed by an API response component 545, as described with reference to FIG. 5.

A method for data processing is described. The method may include: receiving, at a server host, a login request that includes a clear text password for an account associated with a tenant of a multi-tenant cloud platform; retrieving, from a database associated with the multi-tenant cloud platform, an encrypted payload stored in association with the account, the encrypted payload including a hash value of a user-configured password for the account and an indication of a hashing algorithm used to transform the user-configured password into the hash value; obtaining a wrapped symmetric key provisioned by a symmetric key distribution service, where the symmetric key is wrapped using an asymmetric public key associated with the server host; transmitting an API request that includes the encrypted payload retrieved from the database, the clear text password extracted from the login request, and the wrapped symmetric key provisioned by the symmetric key distribution service; and receiving an API response that indicates whether a hash value of the clear text password from the login request corresponds to the hash value of the user-configured password for the account.

An apparatus for data processing is described. The apparatus may include at least one processor, at least one memory coupled with the at least one processor, and instructions stored in the at least one memory. The instructions may be executable by the at least one processor to cause the apparatus to: receive, at a server host, a login request that includes a clear text password for an account associated with a tenant of a multi-tenant cloud platform; retrieve, from a database associated with the multi-tenant cloud platform, an encrypted payload stored in association with the account, the encrypted payload including a hash value of a user-configured password for the account and an indication of a hashing algorithm used to transform the user-configured password into the hash value; obtain a wrapped symmetric key provisioned by a symmetric key distribution service, where the symmetric key is wrapped using an asymmetric public key associated with the server host; transmit an API request that includes the encrypted payload retrieved from the database, the clear text password extracted from the login request, and the wrapped symmetric key provisioned by the symmetric key distribution service; and receive an API response that indicates whether a hash value of the clear text password from the login request corresponds to the hash value of the user-configured password for the account.

Another apparatus for data processing is described. The apparatus may include: means for receiving, at a server host, a login request that includes a clear text password for an account associated with a tenant of a multi-tenant cloud platform; means for retrieving, from a database associated with the multi-tenant cloud platform, an encrypted payload stored in association with the account, the encrypted payload including a hash value of a user-configured password for the account and an indication of a hashing algorithm used to transform the user-configured password into the hash value; means for obtaining a wrapped symmetric key provisioned by a symmetric key distribution service, where the symmetric key is wrapped using an asymmetric public key associated with the server host; means for transmitting an API request that includes the encrypted payload retrieved from the database, the clear text password extracted from the login request, and the wrapped symmetric key provisioned by the symmetric key distribution service; and means for receiving an API response that indicates whether a hash value of the clear text password from the login request corresponds to the hash value of the user-configured password for the account.

A non-transitory computer-readable medium storing code for data processing is described. The code may include instructions executable by at least one processor to: receive, at a server host, a login request that includes a clear text password for an account associated with a tenant of a multi-tenant cloud platform; retrieve, from a database associated with the multi-tenant cloud platform, an encrypted payload stored in association with the account, the encrypted payload including a hash value of a user-configured password for the account and an indication of a hashing algorithm used to transform the user-configured password into the hash value; obtain a wrapped symmetric key provisioned by a symmetric key distribution service, where the symmetric key is wrapped using an asymmetric public key associated with the server host; transmit an API request that includes the encrypted payload retrieved from the database, the clear text password extracted from the login request, and the wrapped symmetric key provisioned by the symmetric key distribution service; and receive an API response that indicates whether a hash value of the clear text password from the login request corresponds to the hash value of the user-configured password for the account.

Some examples of the methods, apparatuses, and non-transitory computer-readable media described herein may further include operations, features, means, or instructions for: transmitting, to a key protection component of the server host, a message indicating the user-configured password and the wrapped symmetric key; and receiving, from the key protection component and in response to the message, the encrypted payload and an initialization vector associated with the encrypted payload.

In some examples of the methods, apparatuses, and non-transitory computer-readable media described herein, the message may be configured to cause the key protection component to: unwrap the symmetric key using an asymmetric private key corresponding to the asymmetric public key of the server host; transform the user-configured password into the hash value using the hashing algorithm; generate the payload including the hash value and the indication of the hashing algorithm; encrypt the payload using the unwrapped symmetric key and the initialization vector; and return the encrypted payload to the server host along with the initialization vector.

Some examples of the methods, apparatuses, and non-transitory computer-readable media described herein may further include operations, features, means, or instructions for: storing, within the database, the encrypted payload and the initialization vector in association with the account; retrieving the encrypted payload and the initialization vector from the database in response to the login request; and including the encrypted payload and the initialization vector in the API request.

In some examples of the methods, apparatuses, and non-transitory computer-readable media described herein, the hashing algorithm used to transform the user-configured password into the hash value may be selected by the key protection component.

In some examples of the methods, apparatuses, and non-transitory computer-readable media described herein, the wrapped symmetric key may be provisioned by a symmetric key distribution service that includes at least one of an HSM, or a master host, or a quorum-based key sharing service.

In some examples of the methods, apparatuses, and non-transitory computer-readable media described herein, the API request may be configured to cause a key protection component of the server host to: unwrap the symmetric key using an asymmetric private key corresponding to the asymmetric public key of the server host; decrypt the payload using the unwrapped symmetric key and an initialization vector associated with the payload; generate a hash value of the clear text password from the login request using the hashing algorithm indicated by the decrypted payload; and compare the hash value of the clear text password to the hash value of the user-configured password indicated by the decrypted pay load.

In some examples of the methods, apparatuses, and non-transitory computer-readable media described herein, obtaining the wrapped symmetric key may include operations, features, means, or instructions for: transmitting, to a symmetric key distribution service associated with the multi-tenant cloud platform, a first message indicating the asymmetric public key of the server host and the symmetric key that is wrapped using an intermediate key provisioned by the symmetric key distribution service; and receiving, from the symmetric key distribution service, a second message indicating the symmetric key wrapped using the asymmetric public key associated with the server host.

In some examples of the methods, apparatuses, and non-transitory computer-readable media described herein, the first message may be configured to cause the symmetric key distribution service to: unwrap the symmetric key using the intermediate key provisioned by the symmetric key distribution service; rewrap the symmetric key using the asymmetric public key of the server host; and return the rewrapped symmetric key to the server host via the second message.

Some examples of the methods, apparatuses, and non-transitory computer-readable media described herein may further include operations, features, means, or instructions for storing, within the database, the symmetric key that is wrapped using the intermediate key provisioned by the symmetric key distribution service.

In some examples of the methods, apparatuses, and non-transitory computer-readable media described herein, obtaining the symmetric key may include operations, features, means, or instructions for retrieving, from the database, the symmetric key that is wrapped using the asymmetric public key associated with the server host, where the database includes two or more instances of the symmetric key that are wrapped using respective asymmetric public keys associated with other server hosts in a sub-system of the multi-tenant cloud platform that includes the server host and the database.

In some examples of the methods, apparatuses, and non-transitory computer-readable media described herein, the user-configured password may be locally hashed and encrypted by a key protection component of the server host.

In some examples of the methods, apparatuses, and non-transitory computer-readable media described herein, the hashing algorithm includes SHA-256, SHA-384, SHA-512, or a Keccak algorithm.

In some examples of the methods, apparatuses, and non-transitory computer-readable media described herein, the API response includes a Boolean to indicate whether a hash value of the clear text password from the login request corresponds to the hash value of the user-configured password for the account.

In some examples of the methods, apparatuses, and non-transitory computer-readable media described herein, the symmetric key may be provisioned for a sub-system of the multi-tenant cloud platform that includes the server host and the database.

The following provides an overview of aspects of the present disclosure:

Aspect 1: A method for data processing, including: receiving, at a server host, a login request that includes a clear text password for an account associated with a tenant of a multi-tenant cloud platform; retrieving, from a database associated with the multi-tenant cloud platform, an encrypted payload stored in association with the account, the encrypted payload including a hash value of a user-configured password for the account and an indication of a hashing algorithm used to transform the user-configured password into the hash value; obtaining a wrapped symmetric key provisioned by a symmetric key distribution service, where the symmetric key is wrapped using an asymmetric public key associated with the server host; transmitting an API request that includes the encrypted payload retrieved from the database, the clear text password extracted from the login request, and the wrapped symmetric key provisioned by the symmetric key distribution service; and receiving an API response that indicates whether a hash value of the clear text password from the login request corresponds to the hash value of the user-configured password for the account.

Aspect 2: The method of aspect 1, further including: transmitting, to a key protection component of the server host, a message indicating the user-configured password and the wrapped symmetric key; and receiving, from the key protection component and in response to the message, the encrypted payload and an initialization vector associated with the encrypted payload.

Aspect 3: The method of aspect 2, where the message is configured to cause the key protection component to unwrap the symmetric key using an asymmetric private key corresponding to the asymmetric public key of the server host; transform the user-configured password into the hash value using the hashing algorithm; generate the payload including the hash value and the indication of the hashing algorithm; encrypt the payload using the unwrapped symmetric key and the initialization vector; and return the encrypted payload to the server host along with the initialization vector.

Aspect 4: The method of any of aspects 2 through 3, further including: storing, within the database, the encrypted payload and the initialization vector in association with the account; retrieving the encrypted payload and the initialization vector from the database in response to the login request; and including the encrypted payload and the initialization vector in the API request.

Aspect 5: The method of any of aspects 2 through 4, where the hashing algorithm used to transform the user-configured password into the hash value is selected by the key protection component.

Aspect 6: The method of any of aspects 1 through 5, where the wrapped symmetric key is provisioned by a symmetric key distribution service that includes at least one of an HSM, or a master host, or a quorum-based key sharing service.

Aspect 7: The method of any of aspects 1 through 6, where the API request is configured to cause a key protection component of the server host to unwrap the symmetric key using an asymmetric private key corresponding to the asymmetric public key of the server host; decrypt the payload using the unwrapped symmetric key and an initialization vector associated with the payload; generate a hash value of the clear text password from the login request using the hashing algorithm indicated by the decrypted payload; and compare the hash value of the clear text password to the hash value of the user-configured password indicated by the decrypted payload.

Aspect 8: The method of any of aspects 1 through 7, where obtaining the wrapped symmetric key includes: transmitting, to a symmetric key distribution service associated with the multi-tenant cloud platform, a first message indicating the asymmetric public key of the server host and the symmetric key that is wrapped using an intermediate key provisioned by the symmetric key distribution service; and receiving, from the symmetric key distribution service, a second message indicating the symmetric key that is wrapped using the asymmetric public key associated with the server host.

Aspect 9: The method of aspect 8, where the first message is configured to cause the symmetric key distribution service to unwrap the symmetric key using the intermediate key provisioned by the symmetric key distribution service; rewrap the symmetric key using the asymmetric public key of the server host; and return the rewrapped symmetric key to the server host via the second message.

Aspect 10: The method of any of aspects 8 through 9, further including: storing, within the database, the symmetric key that is wrapped using the intermediate key provisioned by the symmetric key distribution service.

Aspect 11: The method of any of aspects 1 through 10, where obtaining the symmetric key includes: retrieving, from the database, the symmetric key that is wrapped using the asymmetric public key associated with the server host, where the database includes two or more instances of the symmetric key that are wrapped using respective asymmetric public keys associated with other server hosts in a sub-system of the multi-tenant cloud platform that includes the server host and the database.

Aspect 12: The method of any of aspects 1 through 11, where the user-configured password is locally hashed and encrypted by a key protection component of the server host.

Aspect 13: The method of any of aspects 1 through 12, where the hashing algorithm includes SHA-256, SHA-384, SHA-512, or a Keccak algorithm.

Aspect 14: The method of any of aspects 1 through 13, where the API response includes a Boolean to indicate whether a hash value of the clear text password from the login request corresponds to the hash value of the user-configured password for the account.

Aspect 15: The method of any of aspects 1 through 14, where the symmetric key is provisioned for a sub-system of the multi-tenant cloud platform that includes the server host and the database.

Aspect 16: An apparatus for data processing, including: at least one processor; at least one memory coupled with the at least one processor; and instructions stored in the at least one memory, where the instructions are executable by the at least one processor to cause the apparatus to perform a method of any of aspects 1 through 15.

Aspect 17: An apparatus for data processing, including: at least one means for performing a method of any of aspects 1 through 15.

Aspect 18: A non-transitory computer-readable medium storing code for data processing, the code including instructions that are executable by at least one processor to perform a method of any of aspects 1 through 15.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the at least one processor may be any conventional processor, controller, microcontroller, or state machine. At least one processor may also be implemented as a combination of computing devices (e.g., a combination of a DSP and a microprocessor, multiple microprocessors, one or more microprocessors in conjunction with a DSP core, or any other such configuration).

Any functions or operations described herein as being capable of being performed by at least one processor may be performed by multiple processors that, individually or collectively, are capable of performing the described functions or operations. For example, the functions described herein may be performed by multiple processors, each tasked with at least a subset of the described functions, such that, collectively, the multiple processors perform all of the described functions. As such, the described functions can be performed by a single processor or a group of processors functioning together (i.e., collectively) to perform the described functions, where any one processor performs at least a subset of the described functions.

Likewise, any functions or operations described herein as being capable of being performed by at least one memory may be performed by multiple memories that, individually or collectively, are capable of performing the described functions or operations. For example, the functions described herein may be performed by multiple memories, each tasked with at least a subset of the described functions, such that, collectively, the multiple memories perform all of the described functions. As such, the described functions can be performed by a single memory or a group of memories functioning together (i.e., collectively) to perform the described functions, where any one memory performs at least a subset of the described functions.

The functions described herein may be implemented in hardware, software executed by at least one processor, firmware, or any combination thereof. If implemented in software executed by at least one processor, the functions may be stored on or transmitted over as one or more instructions or code on a computer-readable medium. Other examples and implementations are within the scope of the disclosure and appended claims. For example, due to the nature of software, functions described above can be implemented using software executed by at least one processor, hardware, firmware, hardwiring, or combinations of any of these. Features implementing functions may also be physically located at various positions, including being distributed such that portions of functions are implemented at different physical locations.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" refers to any or all of the one or more components. For example, a component introduced with the article "a" shall be understood to mean "one or more components," and referring to "the component" subsequently in the claims shall be understood to be equivalent to referring to "at least one of the one or more components."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can include RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data processing, comprising:

transmitting, to a key protection component of a server host, a message including a user-configured password and a wrapped symmetric key, wherein the user-configured password is related to an account associated with a tenant of a multi-tenant cloud platform;

receiving, from the key protection component and in response to the message, an encrypted payload and an initialization vector associated with the encrypted payload, wherein the encrypted payload comprises a hash value of the user-configured password for the account and an indicator of a hashing algorithm used for generation of the hash value, and wherein the encrypted payload and the initialization vector are stored in a database in association with the account, wherein the database is associated with the multi-tenant cloud platform;

receiving, at the server host, a login request that includes a clear text password for the account associated with a tenant of a multi-tenant cloud platform;

retrieving, from the database associated with the multi-tenant cloud platform, the encrypted payload stored in association with the account, the encrypted payload comprising a hash value of a user-configured password for the account and an indicator of a hashing algorithm used for generation of the hash value;

obtaining the wrapped symmetric key provisioned by a symmetric key distribution service, wherein the symmetric key is wrapped using an asymmetric public key associated with the server host;

transmitting an application programming interface (API) request comprising the encrypted payload retrieved from the database, the clear text password extracted from the login request, and the wrapped symmetric key provisioned by the symmetric key distribution service; and receiving an API response that indicates whether a hash value of the clear text password from the login request corresponds to the hash value of the user-configured password for the account.

2. The method of claim 1, wherein the message is configured to cause the key protection component to:

unwrap the symmetric key using an asymmetric private key corresponding to the asymmetric public key of the server host;

transform the user-configured password into the hash value using the hashing algorithm;

generate the payload comprising the hash value and the indication of the hashing algorithm;

encrypt the payload using the unwrapped symmetric key and the initialization vector;

and return the encrypted payload to the server host along with the initialization vector.

3. The method of claim 1, further comprising:

storing, within the database, the encrypted payload and the initialization vector in association with the account;

retrieving the encrypted payload and the initialization vector from the database in response to the login request; and including the encrypted payload and the initialization vector in the API request.

4. The method of claim 1, wherein the hashing algorithm used to transform the user-configured password into the hash value is selected by the key protection component.

5. The method of claim 1, wherein the wrapped symmetric key is provisioned by the symmetric key distribution service that comprises at least one of a hardware security module (HSM), or a master host, or a quorum-based key sharing service.

6. The method of claim 1, wherein the API request is configured to cause the key protection component of the server host to:

unwrap the symmetric key using an asymmetric private key corresponding to the asymmetric public key of the server host;

decrypt the payload using the unwrapped symmetric key and the initialization vector associated with the payload;

generate a hash value of the clear text password from the login request using the hashing algorithm indicated by the decrypted payload; and compare the hash value of the clear text password to the hash value of the user-configured password indicated by the decrypted payload.

7. The method of claim 1, wherein obtaining the wrapped symmetric key comprises:

transmitting, to the symmetric key distribution service associated with the multi-tenant cloud platform, a first message indicating the asymmetric public key of the server host and the symmetric key that is wrapped using an intermediate key provisioned by the symmetric key distribution service, wherein the asymmetric public key of the server host is included in a certificate of the server host; and receiving, from the symmetric key distribution service, a second message indicating the symmetric key that is wrapped using the asymmetric public key associated with the server host.

8. The method of claim 7, wherein the first message is configured to cause the symmetric key distribution service to:

unwrap the symmetric key using the intermediate key provisioned by the symmetric key distribution service;

rewrap the symmetric key using the asymmetric public key of the server host; and return the rewrapped symmetric key to the server host via the second message.

9. The method of claim 7, further comprising:

storing, within the database, the symmetric key that is wrapped using the intermediate key provisioned by the symmetric key distribution service.

10. The method of claim 1, wherein obtaining the symmetric key comprises:

retrieving, from the database, the symmetric key that is wrapped using the asymmetric public key associated with the server host, wherein the database comprises two or more instances of the symmetric key that are wrapped using respective asymmetric public keys associated with other server hosts in a sub-system of the multi-tenant cloud platform that includes the server host and the database.

11. The method of claim 1, wherein the user-configured password is locally hashed and encrypted by the key protection component of the server host.

12. The method of claim 1, wherein the hashing algorithm comprises a 256-bit secure hashing algorithm (SHA-256), a 384-bit secure hashing algorithm (SHA-384), a 512-bit secure hashing algorithm (SHA-512), or a Keccak algorithm.

13. The method of claim 1, wherein the API response comprises a Boolean to indicate whether a hash value of the clear text password from the login request corresponds to the hash value of the user-configured password for the account.

14. The method of claim 1, wherein the symmetric key is provisioned for a sub-system of the multi-tenant cloud platform that includes the server host and the database.

15. An apparatus for data processing, comprising:

at least one processor;

at least one memory coupled with the at least one processor; and instructions stored in the at least one memory and executable by the at least one processor to cause the apparatus to:

transmit, to a key protection component of a server host, a message including a user-configured password and a wrapped symmetric key, wherein the user-configured password is related to an account associated with a tenant of a multi-tenant cloud platform;

receive, from the key protection component and in response to the message, an encrypted payload and an initialization vector associated with the encrypted payload, wherein the encrypted payload comprises a hash value of the user-configured password for the account and an indicator of a hashing algorithm used for generation of the hash value, and wherein the encrypted payload and the initialization vector are stored in a database in association with the account, wherein the database is associated with the multi-tenant cloud platform;

receive, at the server host, a login request that includes a clear text password for the account associated with a tenant of a multi-tenant cloud platform;

retrieve, from the database associated with the multi-tenant cloud platform, the encrypted payload stored in association with the account, the encrypted payload comprising a hash value of a user-configured password for the account and an indicator of a hashing algorithm used for generation of the hash value;

obtain the wrapped symmetric key provisioned by a symmetric key distribution service, wherein the symmetric key is wrapped using an asymmetric public key associated with the server host;

transmit an application programming interface (API) request that includes the encrypted payload retrieved from the database, the clear text password extracted from the login request, and the wrapped symmetric key provisioned by the symmetric key distribution service; and receive an API response that indicates whether a hash value of the clear text password from the login request corresponds to the hash value of the user-configured password for the account.

16. The apparatus of claim 15, wherein the message is configured to cause the key protection component to:

unwrap the symmetric key using an asymmetric private key corresponding to the asymmetric public key of the server host;

transform the user-configured password into the hash value using the hashing algorithm;

generate the payload comprising the hash value and the indication of the hashing algorithm;

encrypt the payload using the unwrapped symmetric key and the initialization vector; and return the encrypted payload to the server host along with the initialization vector.

17. The apparatus of claim 15, wherein the instructions are further executable by the at least one processor to cause the apparatus to:

store, within the database, the encrypted payload and the initialization vector in association with the account;

retrieve the encrypted payload and the initialization vector from the database in response to the login request; and include the encrypted payload and the initialization vector in the API request.

18. A non-transitory computer-readable medium storing code for data processing, the code comprising instructions executable by at least one processor to:

transmit, to a key protection component of a server host, a message including a user-configured password and a wrapped symmetric key, wherein the user-configured password is related to an account associated with a tenant of a multi-tenant cloud platform;

receive, from the key protection component and in response to the message, an encrypted payload and an initialization vector associated with the encrypted payload, wherein the encrypted payload comprises a hash value of the user-configured password for the account and an indicator of a hashing algorithm used for generation of the hash value, and wherein the encrypted payload and the initialization vector are stored in a database in association with the account, wherein the database is associated with the multi-tenant cloud platform;

receive, at the server host, a login request that includes a clear text password for the account associated with a tenant of a multi-tenant cloud platform;

retrieve, from the database associated with the multi-tenant cloud platform, the encrypted payload stored in association with the account, the encrypted payload comprising a hash value of a user-configured password for the account and an indicator of a hashing algorithm used for generation of the hash value;

obtain the wrapped symmetric key provisioned by a symmetric key distribution service, wherein the symmetric key is wrapped using an asymmetric public key associated with the server host;

transmit an application programming interface (API) request that includes the encrypted payload retrieved from the database, the clear text password extracted from the login request, and the wrapped symmetric key provisioned by the symmetric key distribution service; and receive an API response that indicates whether a hash value of the clear text password from the login request corresponds to the hash value of the user-configured password for the account.

\*　\*　\*　\*　\*